United States Patent
Gao et al.

(10) Patent No.: US 9,813,733 B2
(45) Date of Patent: *Nov. 7, 2017

(54) DIFFERENTIAL PULSE CODE MODULATION INTRA PREDICTION FOR HIGH EFFICIENCY VIDEO CODING

(71) Applicant: Futurewei Technologies, Inc., Plano, TX (US)

(72) Inventors: Wen Gao, West Windsor, NJ (US); Minqiang Jiang, Campbell, CA (US); Ye He, West Lafayette, IN (US); Jin Song, Shenzhen (CN); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,426

(22) Filed: Dec. 22, 2015

(65) Prior Publication Data

US 2016/0112720 A1    Apr. 21, 2016

Related U.S. Application Data

(63) Continuation of application No. 13/668,094, filed on Nov. 2, 2012, now Pat. No. 9,253,508.

(Continued)

(51) Int. Cl.
*H04N 19/176*    (2014.01)
*H04N 19/593*    (2014.01)
(Continued)

(52) U.S. Cl.
CPC ......... *H04N 19/593* (2014.11); *H04N 19/176* (2014.11); *H04N 19/182* (2014.11);
(Continued)

(58) Field of Classification Search
CPC .... H04N 19/11; H04N 19/137; H04N 19/147; H04N 19/174; H04N 19/176; H04N 19/182; H04N 19/593; H04N 19/91
(Continued)

(56) References Cited

U.S. PATENT DOCUMENTS 5,847,776 A    12/1998    Khmelnitsky et al.
6,125,210 A    9/2000    Yang
(Continued)

FOREIGN PATENT DOCUMENTS

CN    101222771 A    7/2008
CN    102917339 A    2/2013
(Continued)

OTHER PUBLICATIONS

Yan et al, Group-Based Fast Mode Decision Algorithm for Intra Prediction In HEVC, 2012.*

(Continued)

*Primary Examiner* — Shan Elahi
(74) *Attorney, Agent, or Firm* — Conley Rose, P.C.

(57) ABSTRACT

A video codec including a memory and a processor operably coupled to the memory. The processor is configured to compute a reconstructed pixel based on a residual pixel and a first prediction pixel and compute a second prediction pixel in a directional intra prediction mode based on the reconstructed pixel, where the first and second prediction pixels are located in a same block of a video frame. A method for intra prediction including computing a prediction pixel adaptively based on a plurality of reconstructed neighboring pixels, where a distance between the prediction pixel and each of the plurality of reconstructed neighboring pixels is one.

28 Claims, 15 Drawing Sheets

Related U.S. Application Data

(60) Provisional application No. 61/556,014, filed on Nov. 4, 2011.

(51) Int. Cl.
  H04N 19/91 (2014.01)
  H04N 19/182 (2014.01)
  *H04N 19/147* (2014.01)
  *H04N 19/11* (2014.01)
  *H04N 19/137* (2014.01)
  *H04N 19/174* (2014.01)

(52) U.S. Cl.
  CPC ............. *H04N 19/91* (2014.11); *H04N 19/11* (2014.11); *H04N 19/137* (2014.11); *H04N 19/147* (2014.11); *H04N 19/174* (2014.11)

(58) Field of Classification Search
  USPC .................................................... 375/240.14
  See application file for complete search history.

(56) References Cited

U.S. PATENT DOCUMENTS

| | | | | |
|---|---|---|---|---|
| 6,233,278 | B1* | 5/2001 | Dieterich | H04N 19/46 348/700 |
| 6,272,180 | B1 | 8/2001 | Lei | |
| 6,683,992 | B2* | 1/2004 | Takahashi | G06T 9/20 345/630 |
| 6,873,609 | B1 | 3/2005 | Jones et al. | |
| 6,909,810 | B2* | 6/2005 | Maeda | H04N 19/196 375/E7.042 |
| 7,116,830 | B2 | 10/2006 | Srinivasan | |
| 7,295,614 | B1 | 11/2007 | Shen et al. | |
| 7,567,617 | B2 | 7/2009 | Holcomb | |
| 7,599,438 | B2 | 10/2009 | Holcomb et al. | |
| 7,606,308 | B2 | 10/2009 | Holcomb et al. | |
| 7,684,488 | B2 | 3/2010 | Marpe et al. | |
| 8,184,710 | B2 | 5/2012 | Srinivasan et al. | |
| 8,300,696 | B2 | 10/2012 | Liang et al. | |
| 8,331,664 | B2 | 12/2012 | Strom et al. | |
| 8,374,238 | B2* | 2/2013 | Xiong | H04N 19/172 375/240.11 |
| 8,432,968 | B2 | 4/2013 | Ye et al. | |
| 8,588,459 | B2 | 11/2013 | Bloom et al. | |
| 8,724,697 | B2 | 5/2014 | Lee et al. | |
| 9,154,792 | B2 | 10/2015 | Chien et al. | |
| 9,167,245 | B2 | 10/2015 | Lou et al. | |
| 9,253,508 | B2* | 2/2016 | Gao | H04N 19/593 |
| 2002/0034256 | A1 | 3/2002 | Talluri et al. | |
| 2002/0061138 | A1* | 5/2002 | Uenoyama | G06T 9/00 382/232 |
| 2002/0163965 | A1 | 11/2002 | Lee et al. | |
| 2003/0026335 | A1 | 2/2003 | Thyagarajan | |
| 2003/0039396 | A1 | 2/2003 | Irvine et al. | |
| 2003/0095597 | A1 | 5/2003 | Talluri et al. | |
| 2003/0099292 | A1* | 5/2003 | Wang | H04N 19/105 375/240.12 |
| 2003/0118242 | A1 | 6/2003 | Nakayama et al. | |
| 2003/0123742 | A1 | 7/2003 | Zhao et al. | |
| 2004/0045030 | A1 | 3/2004 | Reynolds et al. | |
| 2004/0184545 | A1 | 9/2004 | Thyagarajan | |
| 2005/0013497 | A1* | 1/2005 | Hsu | H04N 19/52 382/239 |
| 2005/0013500 | A1 | 1/2005 | Lee et al. | |
| 2005/0024487 | A1* | 2/2005 | Chen | H04N 19/172 348/14.13 |
| 2005/0025246 | A1 | 2/2005 | Holcomb | |
| 2005/0038837 | A1 | 2/2005 | Marpe et al. | |
| 2005/0078754 | A1 | 4/2005 | Liang et al. | |
| 2005/0219069 | A1 | 10/2005 | Sato et al. | |
| 2005/0222775 | A1 | 10/2005 | Kisra et al. | |
| 2005/0231396 | A1 | 10/2005 | Dunn | |
| 2005/0253740 | A1 | 11/2005 | Marpe et al. | |
| 2006/0008003 | A1* | 1/2006 | Ji | H04N 19/63 375/240.11 |
| 2006/0008038 | A1* | 1/2006 | Song | H04N 19/63 375/350 |
| 2006/0013320 | A1 | 1/2006 | Oguz et al. | |
| 2006/0071826 | A1 | 4/2006 | Saunders et al. | |
| 2006/0093031 | A1 | 5/2006 | Van Der Schaar et al. | |
| 2006/0103556 | A1 | 5/2006 | Malvar | |
| 2006/0114993 | A1* | 6/2006 | Xiong | H04N 19/172 375/240.11 |
| 2006/0120450 | A1* | 6/2006 | Han | H04N 19/176 375/240.03 |
| 2006/0153292 | A1* | 7/2006 | Liang | H04N 19/176 375/240.2 |
| 2006/0222066 | A1 | 10/2006 | Yoo et al. | |
| 2007/0074266 | A1 | 3/2007 | Raveendran et al. | |
| 2007/0081586 | A1 | 4/2007 | Raveendran et al. | |
| 2007/0081587 | A1 | 4/2007 | Raveendran et al. | |
| 2007/0140345 | A1 | 6/2007 | Osamoto et al. | |
| 2007/0171969 | A1 | 7/2007 | Han et al. | |
| 2007/0171985 | A1 | 7/2007 | Kim et al. | |
| 2007/0217703 | A1 | 9/2007 | Kajiwara | |
| 2008/0008238 | A1* | 1/2008 | Song | H04N 19/105 375/240.11 |
| 2008/0037656 | A1 | 2/2008 | Hannuksela | |
| 2008/0043843 | A1* | 2/2008 | Nakaishi | H04N 19/176 375/240.16 |
| 2008/0120676 | A1 | 5/2008 | Morad et al. | |
| 2008/0131087 | A1* | 6/2008 | Lee | H04N 19/90 386/326 |
| 2008/0198931 | A1* | 8/2008 | Chappalli | H04N 19/51 375/240.16 |
| 2008/0240240 | A1 | 10/2008 | Kodama | |
| 2009/0003447 | A1* | 1/2009 | Christoffersen | H04N 19/61 375/240.16 |
| 2009/0016631 | A1* | 1/2009 | Naito et al. | H04N 19/176 382/251 |
| 2009/0034857 | A1 | 2/2009 | Moriya et al. | |
| 2009/0097558 | A1 | 4/2009 | Ye et al. | |
| 2009/0129469 | A1 | 5/2009 | Kimiyama et al. | |
| 2009/0161759 | A1 | 6/2009 | Seo et al. | |
| 2009/0220005 | A1 | 9/2009 | Kim et al. | |
| 2009/0225834 | A1 | 9/2009 | Song et al. | |
| 2009/0257489 | A1* | 10/2009 | Karczewicz | H04N 19/126 375/240.03 |
| 2009/0257492 | A1* | 10/2009 | Andersson | H04N 19/105 375/240.12 |
| 2009/0268823 | A1* | 10/2009 | Dane | H04N 19/61 375/240.27 |
| 2009/0279608 | A1* | 11/2009 | Jeon | H04N 19/597 375/240.16 |
| 2010/0054331 | A1* | 3/2010 | Haddad | H04N 19/176 375/240.12 |
| 2010/0054615 | A1 | 3/2010 | Choi et al. | |
| 2010/0054616 | A1 | 3/2010 | Kim | |
| 2010/0080284 | A1 | 4/2010 | Lee et al. | |
| 2010/0080285 | A1 | 4/2010 | Lee et al. | |
| 2010/0080296 | A1 | 4/2010 | Lee et al. | |
| 2010/0104022 | A1 | 4/2010 | Chatterjee et al. | |
| 2010/0118943 | A1 | 5/2010 | Shiodera et al. | |
| 2010/0172409 | A1 | 7/2010 | Reznik et al. | |
| 2010/0260260 | A1 | 10/2010 | Wiegand et al. | |
| 2010/0266008 | A1* | 10/2010 | Reznik | G06F 17/147 375/240.2 |
| 2010/0284613 | A1 | 11/2010 | Tsai et al. | |
| 2011/0080947 | A1 | 4/2011 | Chen et al. | |
| 2011/0150085 | A1 | 6/2011 | Andrijanic et al. | |
| 2011/0158323 | A1 | 6/2011 | Chen et al. | |
| 2011/0164677 | A1* | 7/2011 | Lu | H04N 19/176 375/240.02 |
| 2011/0170602 | A1* | 7/2011 | Lee | H04N 19/44 375/240.16 |
| 2011/0206289 | A1 | 8/2011 | Dikbas et al. | |
| 2011/0243230 | A1 | 10/2011 | Liu | |
| 2011/0248873 | A1 | 10/2011 | Karczewicz et al. | |
| 2011/0280314 | A1 | 11/2011 | Sankaran et al. | |
| 2011/0293001 | A1 | 12/2011 | Lim et al. | |

(56) References Cited

U.S. PATENT DOCUMENTS

| | | |
|---|---|---|
| 2012/0008682 A1 | 1/2012 | Karczewicz et al. |
| 2012/0014436 A1 | 1/2012 | Segall et al. |
| 2012/0027077 A1 | 2/2012 | Reznik |
| 2012/0082215 A1 | 4/2012 | Sze et al. |
| 2012/0082224 A1* | 4/2012 | Van Der Auwera et al. .............. H04N 19/176 375/240.12 |
| 2012/0134425 A1 | 5/2012 | Kossentini et al. |
| 2012/0163471 A1 | 6/2012 | Karczewicz et al. |
| 2012/0170649 A1* | 7/2012 | Chen ..................... H04N 19/159 375/240.12 |
| 2012/0170650 A1 | 7/2012 | Chong et al. |
| 2012/0170662 A1 | 7/2012 | Karczewicz et al. |
| 2012/0230403 A1* | 9/2012 | Liu ....................... H04N 19/176 375/240.12 |
| 2012/0236931 A1 | 9/2012 | Karczewicz et al. |
| 2012/0243608 A1 | 9/2012 | Yu et al. |
| 2012/0243609 A1* | 9/2012 | Zheng ................... H04N 19/197 375/240.15 |
| 2012/0257678 A1* | 10/2012 | Zhou .................... H04N 19/436 375/240.16 |
| 2012/0328207 A1* | 12/2012 | Sasai et al. ............ H04N 19/13 382/233 |
| 2013/0016777 A1 | 1/2013 | Gao et al. |
| 2013/0101033 A1 | 4/2013 | Joshi et al. |
| 2013/0101036 A1 | 4/2013 | Zhou |
| 2013/0114676 A1 | 5/2013 | Guo et al. |
| 2013/0114696 A1 | 5/2013 | Liu |
| 2013/0114716 A1* | 5/2013 | Gao ..................... H04N 19/593 375/240.14 |
| 2013/0114738 A1 | 5/2013 | Chien et al. |
| 2013/0271566 A1 | 10/2013 | Chen et al. |
| 2013/0272377 A1 | 10/2013 | Karczewicz et al. |
| 2013/0287103 A1 | 10/2013 | Seregin et al. |
| 2014/0010293 A1* | 1/2014 | Srinivasan ........... H04N 19/119 375/240.12 |
| 2014/0092980 A1* | 4/2014 | Guo et al. ............ H04N 19/593 375/240.16 |
| 2014/0105296 A1* | 4/2014 | Alshina ................. H04N 19/13 375/240.14 |
| 2014/0126631 A1* | 5/2014 | Zheludkov ............. H04N 19/65 375/240.02 |
| 2014/0328387 A1* | 11/2014 | Puri ..................... H04N 19/176 375/240.02 |
| 2015/0215773 A1 | 7/2015 | Bai et al. |
| 2015/0350640 A1* | 12/2015 | Jeong et al. ......... H04N 19/105 375/240.12 |

FOREIGN PATENT DOCUMENTS

| | | |
|---|---|---|
| CN | 103237034 A | 8/2013 |
| CN | 103501493 A | 1/2014 |
| EP | 2388999 A2 | 11/2011 |
| EP | 2503783 A1 | 6/2012 |
| WO | 2004064406 A1 | 7/2004 |
| WO | 2011069412 A1 | 6/2011 |
| WO | 2011128268 A1 | 10/2011 |

OTHER PUBLICATIONS

Xiao et al, a fine grained parallel implementation of a H.264/Avc encoder on a 167-processor computational platform, 2011.*
Rajovic et al, an image codec with minimum memory size, 2013.*
Bjontegaard, G., "H.26L Test Model Long Term No. 8 (TML-8) Draft0," ITU Telecommunications Standardization Sector, Study Group 16, Video Coding Experts Group (VCEG), VCEG-Nxx, Apr. 2, 2001, pp. 1-2, 16-19.
Bossen, F., et al., "Common Test Conditions and Software References Configurations," Joint Collaborative Team on Video Coding (JCT-VC) of ITU-T SG16 WP3 and ISO/IEC JTC1/SC29/WG11 6th Meeting: Torino, IT, JCTVC-F900, Jul. 14-22, 2011, 3 pages.
Bross, B. et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, IT, JCTVC-F803 d0, Jul. 14-22, 2011, pp. 1-215.
Davies, T. et al., "Suggestion for a Test Model," Joint Collaborative Team on Video Coding (JCT-VC) of ITU-T SG16 WP3 and ISO/IEC JTC1/SC29/WG11, 1st Meeting: Dresden, DE, 2010, JCTVC-A033, Apr. 15-23, pp. 1-30.
Gao, W. et al., "A Lossless Coding Solution for HEVC," Joint Collaborative Team on Video Coding (JCT-VC) of ITU-T SG16 WP3 and ISO/IEC JTC1/SC29/WG11, 7th meeting: Geneva, CH; 2011, JCTVC-G664, Nov. 21-30, pp. 1-7.
Howard, P. et al., "Fast and Efficient Lossless Image Compression," Data Compression Conference, IEEE Computer Society Press, XP000614252, Mar. 30, 1993, pp. 351-360.
Nan, Z., et al., "Spatial Prediction Based Intra-Coding," 2004 IEEE International Conference on Multimedia and Expo (ICME), vol. 1, Jun. 27-30, 2004, pp. 97-100.
Nguyen, T. et al., "Reduced-complexity Entropy Coding of Transform Coefficient Levels Using a Combination of VLC and PIPE," Joint Collaborative Team on Video Coding (JCT-VC) of ITU-T SG16 WP3 and ISO/IEC JTC1/SC29/WG11, retrieved from: http:/wftp3.itu.int/av-arch/jctvc-site/, 4th Meeting: Daegu, KR, JCTVC-D336, Jan. 20-28, 2011, pp. 1-8.
"Vision, Application and Requirements for High Efficiency Video Coding (HEVC)," ISO/IEC JTC1/SC29/WG11/N11872, Video and Requirements Subgroups and JCT-VC, Daegu, Korea, Jan. 2011, 6 pages.
"Working Draft No. 2, Revision 0 (WD-2)," Joint Video Team (JVT) of ISO/IEC MPEG and ITU-T VCEG, Pattaya, Thailand, JVT-B118, Dec. 3-7, 2001, pp. 1, 3-100.
Ye, Y., et al., "Improved H.264 Intra Coding Based on Bi-directional Intra Prediction, Directional Transform, and Adaptive Coefficient Scanning," IEEE International Conference on Image Processing, Oct. 12-15, 2008, pp. 2116-2119.
Kim, H., et al., "A Lossless Color Image Compression Architecture Using a Parallel Golomb-Rice Hardware CODEC", IEEE Transactions on Circuits and Systems for Video Technology, vol. 21, No. 11, Nov. 2011, pp. 1581-1587.
Foreign Communication From A Counterpart Application, PCT Application PCT/US2012/063427, Partial International Search Report dated Jan. 28, 2013, 8 pages.
Foreign Communication From A Counterpart Application, PCT Application PCT/US2012/063428, Partial International Search Report dated Jan. 28, 2013, 8 pages.
Foreign Communication From A Counterpart Application, PCT Application PCT/US2012/063428, International Search Report dated Apr. 4, 2013, 8 pages.
Foreign Communication From A Counterpart Application, PCT Application PCT/US2012/063428, Written Opinion dated Apr. 4, 2013, 10 pages.
Office Action dated Dec. 31, 2014, 33 pages, U.S. Appl. No. 13/668,094, filed Nov. 2, 2012.
Office Action dated Jul. 2, 2015, 31 pages, U.S. Appl. No. 13/668,094, filed Nov. 2, 2012.
Notice of Allowance dated Sep. 17, 2015, 13 pages, U.S. Appl. No. 13/668,094, filed Nov. 2, 2012.
Notice of Allowance dated Nov. 12, 2015, 6 pages, U.S. Appl. No. 13/668,094, filed Nov. 2, 2012.
Office Action dated Dec. 30, 2014, 31 pages, U.S. Appl. No. 13/668,112, filed Nov. 2, 2012.
Notice of Allowance dated May 22, 2015, 17 pages, U.S. Appl. No. 13/668,112, filed Nov. 2, 2012.
Office Action dated Oct. 19, 2015, 23 pages, U.S. Appl. No. 13/668,112, filed Nov. 2, 2012.
Office Action dated Apr. 12, 2016, 18 pages, U.S. Appl. No. 13/668,112, filed Nov. 2, 2012.
Partial English Translation and Abstract of Chinese Patent Application No. CN101222771, Apr. 21, 2016, 18 pages.
Partial English Translation and Abstract of Chinese Patent Application No. CN103237034, Dec. 18, 2015, 5 pages.
Partial English Translation and Abstract of Chinese Patent Application No. CN103501493, Dec. 18, 2015, 4 pages.

(56) References Cited

OTHER PUBLICATIONS

Foreign Communication From A Counterpart Application, PCT Application No. PCT/CN2014/075699, English Translation of International Search Report dated Jan. 20, 2015, 2 pages.
Foreign Communication From A Counterpart Application, PCT Application No. PCT/CN2014/075699, Written Opinion dated Jan. 20, 2015, 5 pages.
Notice of Allowance dated Sep. 28, 2016, 11 pages, U.S. Appl. No. 13/668,112, filed Nov. 2, 2012.

* cited by examiner

| X(-1) Y(-1) | X(0) | X(1) | X(2) | X(3) | X(4) | X(5) | X(6) | X(7) |
|---|---|---|---|---|---|---|---|---|
| Y(0) | Z(0, 0) | Z(0, 1) | Z(0, 2) | Z(0, 3) | | | | |
| Y(1) | Z(1, 0) | Z(1, 1) | Z(1, 2) | Z(1, 3) | | | | |
| Y(2) | Z(2, 0) | Z(2, 1) | Z(2, 2) | Z(2, 3) | | | | |
| Y(3) | Z(3, 0) | Z(3, 1) | Z(3, 2) | Z(3, 3) | | | | |
| Y(4) | | | | | | | | |
| Y(5) | | | | | | | | |
| Y(6) | | | | | | | | |
| Y(7) | | | | | | | | |

| X(-1) Y(-1) | X(0) | X(1) | X(2) | X(3) |
|---|---|---|---|---|
| Y(0) | R(0, 0) | R(0, 1) | R(0, 2) | R(0, 3) |
| Y(1) | P(1, 0) | P(1, 1) | P(1, 2) | |
| Y(2) | | | | |
| Y(3) | | | | |

| X(-1) Y(-1) | X(0) | X(1) | X(2) | X(3) |
|---|---|---|---|---|
| Y(0) | R(0, 0) | R(0, 1) | R(0, 2) | R(0, 3) |
| Y(1) | R(0, 0) | R(1, 1) | R(1, 2) | R(1, 3) |
| Y(2) | P(2, 0) | P(2, 1) | R(2, 2) | |
| Y(3) | | | | |

FIG. 4C

| X(-1) Y(-1) | Y(0) | Y(1) | Y(2) | Y(3) | Y(4) | Y(5) | Y(6) | Y(7) |
|---|---|---|---|---|---|---|---|---|
| X(0) | Z(0, 0) | Z(1, 0) | Z(2, 0) | Z(3, 0) | | | | |
| X(1) | Z(0, 1) | Z(1, 1) | Z(2, 1) | Z(3, 1) | | | | |
| X(2) | Z(0, 2) | Z(1, 2) | Z(2, 2) | Z(3, 2) | | | | |
| X(3) | Z(0, 3) | Z(1, 3) | Z(2, 3) | Z(3, 3) | | | | |
| X(4) | | | | | | | | |
| X(5) | | | | | | | | |
| X(6) | | | | | | | | |
| X(7) | | | | | | | | |

FIG. 5

| C | B | D |
|---|---|---|
| A | X |   |

FIG. 6

DIFFERENTIAL PULSE CODE MODULATION INTRA PREDICTION FOR HIGH EFFICIENCY VIDEO CODING

CROSS-REFERENCE TO RELATED APPLICATIONS

The present application is a continuation of U.S. patent application Ser. No. 13/668,094 filed Nov. 2, 2012 by Wen Gao, et al., and entitled "Differential Pulse Code Modulation Intra Prediction for High Efficiency Video Coding," and claims priority to U.S. Provisional Patent Application No. 61/556,014 filed Nov. 4, 2011 by Wen Gao, et al., and entitled "Lossless Coding Tools for Compound Video," each of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

For example, video compression may use intra-frame prediction, in which a pixel may be predicted from a reference pixel in the same video frame or slice. An accuracy of prediction may depend on a distance between the predicted pixel and its reference pixel. Thus, if the distance is relatively big, the accuracy of intra-prediction may decrease, and a bit-rate needed for the compressed video may increase.

SUMMARY

In one embodiment, the disclosure includes video codec having a memory and a processor operably coupled to the memory. The processor is configured to compute a reconstructed pixel based on a residual pixel and a first prediction pixel and compute a second prediction pixel in a directional intra prediction mode based on the reconstructed pixel, wherein the first and second prediction pixels are located in a same block of a video frame.

In another embodiment, the disclosure includes a method comprising computing a reconstructed pixel based on a residual pixel and a first prediction pixel, and computing a second prediction pixel in a directional intra prediction mode based on the reconstructed pixel, wherein the first and second prediction pixels are located in a same block of a video frame.

In yet another embodiment, the disclosure includes a video codec comprising a processor configured to use intra prediction to generate a prediction pixel adaptively based on a plurality of reconstructed neighboring pixels, wherein a distance between the prediction pixel and each of the plurality of reconstructed neighboring pixels is one.

In yet another embodiment, the disclosure includes a method for intra prediction comprising computing a prediction pixel adaptively based on a plurality of reconstructed neighboring pixels, wherein a distance between the prediction pixel and each of the plurality of reconstructed neighboring pixels is one.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a diagram of an embodiment of a 4×4 current block and its 17 external reference pixels.

FIGS. 4A-4D are diagrams of an embodiment of an intra prediction scheme in a diagonal intra prediction mode.

FIG. 5 is a diagram of an example of a transposed 4×4 block and its transposed external reference pixels.

FIG. 6 is a diagram of an example of a pixel and its left and upper neighboring pixels.

DETAILED DESCRIPTION

Figure 1:
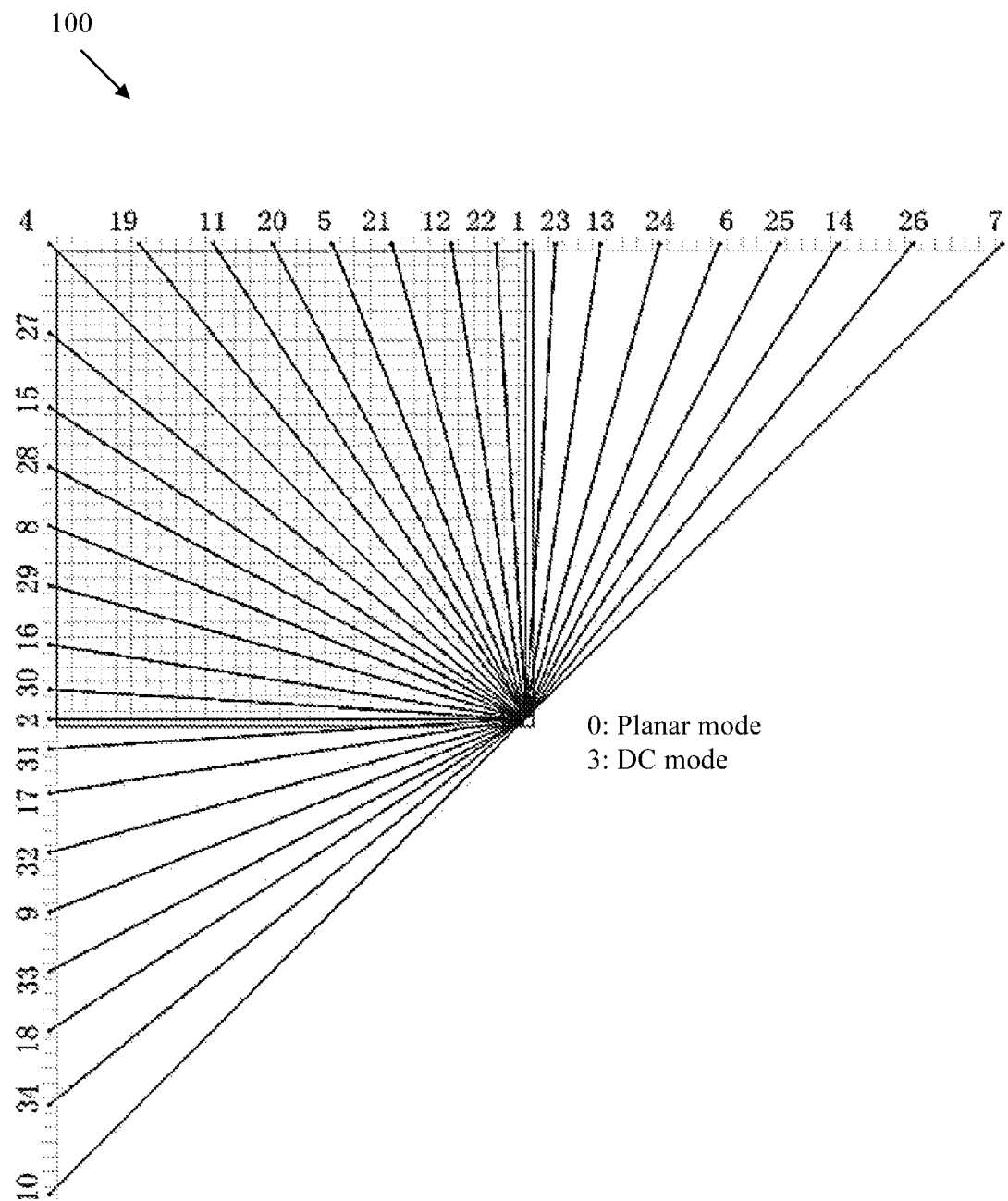
FIG. 1 is a diagram of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture samples or pixels, each of which may represent a single reference point in the frame. During digital processing, each pixel may be assigned an integer value (e.g., 0, 1, . . . or 255) that represents an image quality or characteristic, such as luminance (luma or Y) or chrominance (chroma including U and V), at the corresponding reference point. In use, an image or video frame may comprise a large amount of pixels (e.g., 2,073,600 pixels in a 1920×1080 frame), thus it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise N2 pixels, where N is an integer and often a multiple of four.

In working drafts of the International Telecommunications Union (ITU) Telecommunications Standardization Sector (ITU-T) and the International Organization for Standardization (ISO)/International Electrotechnical Commission (IEC) high efficiency video coding (HEVC), which is poised to be a future video standard, new block concepts have been introduced. For example, coding unit (CU) may refer to a sub-partitioning of a video frame into rectangular blocks of equal or variable size. In HEVC, a CU may replace a macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Depending on the application, a block may be coded in either a lossless mode (i.e., no distortion or information loss) or a lossy mode (i.e., with distortion). In use, high quality videos may be coded using a lossless mode, while low quality videos may be coded using a lossy mode. Sometimes, a single video frame or slice (e.g., with YUV subsampling of either 4:4:4 or 4:2:0) may employ both lossless and lossy modes to code a plurality of regions, which may be rectangular or irregular in shape. Each region may comprise a plurality of blocks. For example, a compound video may comprise a combination of different types of contents, such as texts, computer graphics, and natural-view content (e.g., camera-captured video). In a compound frame, regions of texts and graphics may be coded in a lossless mode, while regions of natural-view content may be coded in a lossy mode. Lossless coding of texts and graphics may be desired, e.g. in computer screen sharing applications, since lossy coding may lead to poor quality or fidelity of texts and graphics and cause eye fatigue. Due to lack a lossless coding mode, the coding efficiency of current HEVC test models (HMs) for certain videos (e.g., compound video) may be limited.

Within a video frame or slice, a pixel may be correlated with other pixels within the same frame such that pixel values within a block or across some blocks may vary only slightly and/or exhibit repetitious textures. Modern methods of video-compression exploit these spatial correlations using various techniques which may be known collectively as intra-frame prediction (or in short as intra prediction). Intra-frame prediction may reduce spatial redundancies between neighboring blocks in the same frame, thereby compressing the video data without greatly reducing image quality.

In practice, intra-frame prediction may be implemented by video encoders/decoders (codecs) to interpolate a prediction block (or predicted block) from one or more previously coded/decoded neighboring blocks, thereby creating an approximation of the current block. Hence, the encoder and decoder may interpolate the prediction block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone may not reproduce an image of sufficient quality for modern video, and consequently an error correction message, e.g., a residual message, may be communicated between the encoder and decoder to correct differences between the prediction block and the current block. For instance, an encoder may subtract the prediction block from the current block, or vice versa, to produce a residual block, which then may be transformed, quantized, and scanned before being coded into the coded data stream. Upon reception of the coded data stream, a decoder may add the reconstructed residual block to the independently generated prediction block to reconstruct the current block. Although the reconstructed current block may be an imperfect version of the original current block, their differences may be hardly perceptible to the human eye. Thus, substantial bit savings may be obtained without significantly degrading the quality of the reconstructed image.

The residual block may comprise few differences between the prediction block and the current block, and therefore many of the residual block's discrete values, e.g., pixel data, may comprise zero and/or near-zero coefficients, e.g., in areas where the prediction block is identical and/or near-identical to the current block. Furthermore, transformation, quantization, and/or scanning of the residual block may remove many of the zero and/or near-zero coefficients from the data stream, thereby resulting in further compression of the video data. More accurate predictions of the original image may lead to higher coding efficiencies. To harness these coding efficiencies, conventional video/image coding standards may improve prediction accuracy by using a plurality of prediction modes during intra prediction, e.g., each of which may generate a unique texture.

FIG. 1 illustrates a diagram of a plurality of intra prediction modes 100 (also referred hereafter as intra modes), which may be used, for example, in a HEVC unified intra prediction (UIP) scheme. For luminance blocks, the intra prediction modes 100 may comprise up to 35 intra prediction modes, which may include 33 directional modes and 2 non-directional modes, such as a direct current (DC) prediction mode and a planar prediction mode. Each mode may be assigned a mode name, which may be application dependent. In HEVC, the planar mode may be assigned or appointed as mode 0, the DC mode as mode 3, the horizontal mode as mode 2, and so forth. The 33 directional modes may cover a π-radian or 180-degree angular range. If the direction of a vertical mode (i.e., mode 1 in FIG. 1) is regarded as zero degree, the 33 directional modes may be symmetrical about the −45 degrees axis (i.e., mode 4 in FIG. 1).

In use, an encoder may use a rate-distortion optimization (RDO) process to select a prediction mode that generates the most accurate prediction for each current block. For example, the sum of absolute difference (SAD) may be calculated for each mode in the intra prediction modes 100, and the one with the least SAD may be selected. In general, more accurate intra prediction may be resulted from a larger number of intra prediction modes. For example, recent research has shown that intra prediction schemes using 35 intra-frame prediction modes, such as the intra prediction modes 100, may more accurately predict complex textures than schemes using fewer prediction modes, such as ITU-T H.264/advanced video coding (AVC), which uses only 9 intra prediction modes. While FIG. 1 shows 35 intra prediction modes, depending on block-size, the intra prediction scheme, and/or video coding standard, any other number of prediction modes may also be used.

In current intra prediction schemes, pixels surrounding a current block may be used as reference pixels (or prediction samples) to generate a prediction block. The quality of intra prediction may be affected by factors such as block size and prediction mode. For example, as the size of the prediction block increases, pixels in the prediction block that are farther away from the reference pixels may have less spatial correlation with the reference pixels, thus the prediction accuracy of the father pixels may be degraded. This degradation of prediction accuracy may result in more residual data, which in turn may increase the data to be encoded, stored, and/or transmitted.

Disclosed herein are systems and methods for improved intra prediction in video coding. Instead of the block-by-block intra prediction currently used, the disclosure teaches intra prediction schemes based on pixel-by-pixel (or sample-by-sample) differential pulse code modulation (DPCM). Embodiments of the DPCM intra prediction schemes may be used in any intra prediction mode, such as one of the 33 directional modes shown in FIG. 1. Further, intra prediction may be implemented using disclosed pixel-based non-directional predictors, which predict a pixel adaptively based on its left and upper neighboring pixels. Regardless of a size of a current block, except for some boundary pixels in the DPCM scheme, in the DPCM and pixel-based prediction schemes a distance between the prediction pixel and its one or more reference pixels may remain one, which may improve accuracy of intra prediction. Despite their pipeline or set-by-set fashion of intra prediction, the disclosed intra prediction schemes may not have a major complexity penalty, while at the same time improving coding efficiency of lossless coding.

Figure 2:
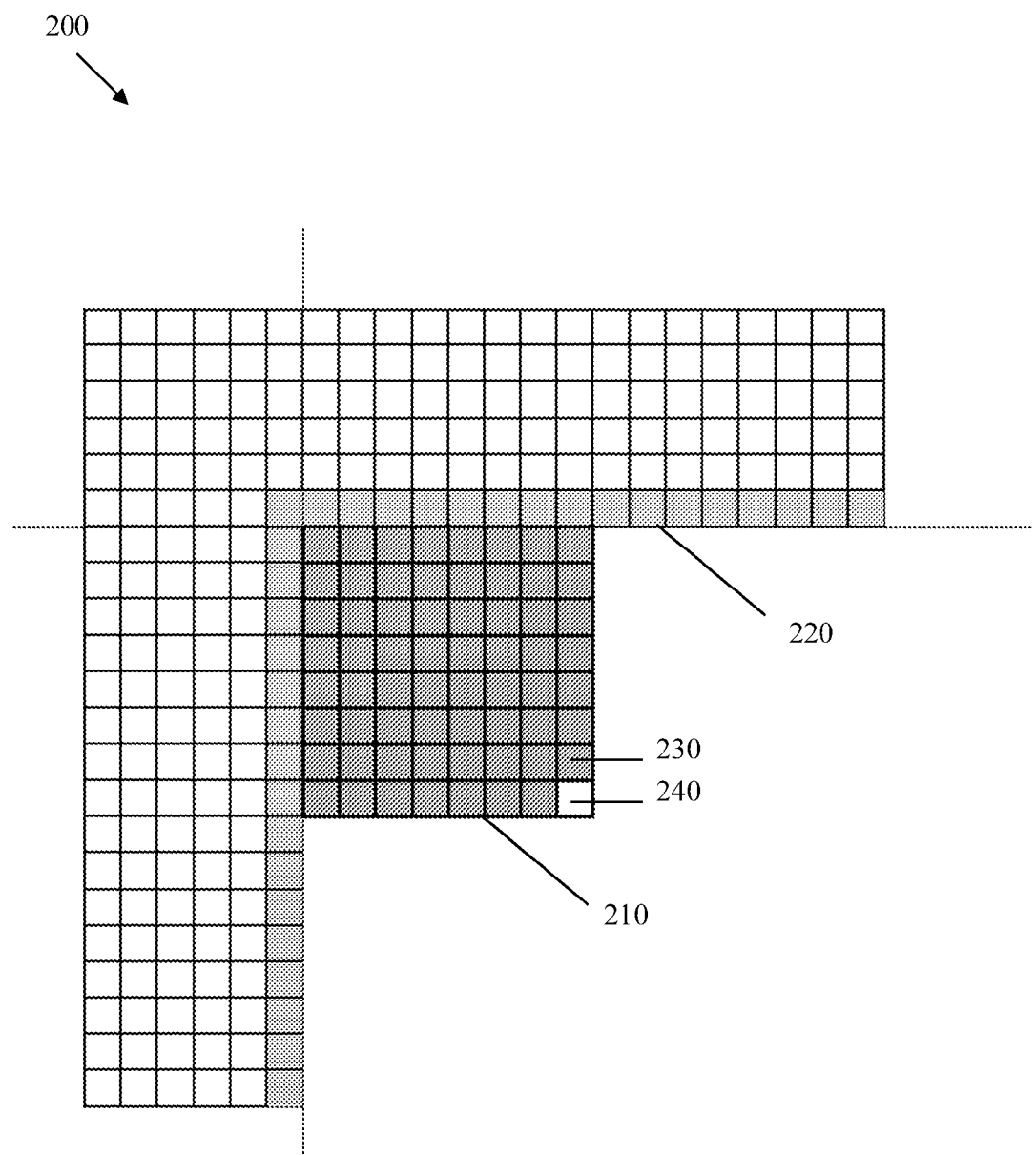
FIG. 2 is a diagram of an embodiment of a differential pulse code modulation (DPCM) intra prediction scheme.

FIG. 2 shows an embodiment of a DPCM intra prediction scheme 200. To predict an N×N current block 210, the intra prediction scheme 200 may generate an N×N prediction block. For the purpose of illustration, the current block 210 has a size of 8×8 in FIG. 2, although any other block size may also be used. Since pixels surrounding the current block 210 may have already been coded prior to the current block 210, they may be used to predict the current block 210. Particularly, a number of pixels located in a column left to (and adjacent) the current block 210, and in a row above (and adjacent) the current block 210 may be used as reference pixels of intra prediction. As these pixels are located outside the current block 210, they may be referred to hereafter as external reference pixels 220, which are marked as downward-hatched pixels in FIG. 2. Since up to 35 intra prediction modes may be used (e.g., shown in FIG. 1) in HEVC, the number of external reference pixels 220 may be up to 4N+1 for an N×N prediction block. For example, for the 8×8 current block 210, there may be up to 33 external reference pixels 220. While FIG. 2 shows a square current block 210, it should be understood that a disclosed DPCM intra prediction scheme may also be used to predict non-square blocks, which may be used in a short distance intra prediction (SDIP) scheme.

In contrast with current intra prediction schemes which may generate all prediction pixels (or predicted pixels) of the current block in a parallel fashion, the disclosed intra prediction may generate multiple sets of prediction pixels in a pipeline or sequential fashion. If lossless coding is used, the disclosed intra prediction may generate all prediction pixels (or predicted pixels) of current block in a parallel fashion, since in this case the original pixels are the same as their reconstructed pixels. In an embodiment, a portion of the external reference blocks 220 may used to generate an initial set of prediction pixels. The initial set herein may refer to pixels that are predicted first according to a particular intra mode, such as a top/bottom row and/or a leftmost/rightmost column of the current block 210. For example, in a diagonal mode numbered as mode 7 in FIG. 1, the initial set may be the top row and the rightmost column. For another example, in mode 33 in FIG. 1, the initial set may be the leftmost column and the bottom row. For yet another example, in a horizontal mode numbered as mode 2 in FIG. 1, the initial set may be the leftmost column alone.

After obtaining the initial set of prediction pixels, the initial set of residual or differential pixels may be generated by subtracting original pixel values from the prediction values, or vice versa. Then, continuing sets of prediction pixels may be based on reference pixels located within the current block 210, which may be referred to hereafter as internal reference pixels 230. To avoid potential decoding drift, same external/internal reference pixels should be used in an encoder and a decoder. Thus, reconstructed pixels rather than original pixels may be used as external/internal reference pixels. Note that in lossless coding, the reconstructed pixels may be the same as the original pixels.

The continuing sets of prediction pixels may be computed from reconstructed pixels within the current block. For example, in a vertical mode, the second row to the top may be predicted from a reconstructed top row, the third row to the top may be predicted from a reconstructed second row to the top, and so forth. Taking into account all prediction modes, all pixels in the current block, except one in a bottom-right corner, may be potentially used as internal reference pixels. As shown in FIG. 2, the internal reference pixels 230 are marked as upward-hatched pixels, and the bottom-right corner pixel 240 is not hatched. In the present disclosure, since each set of pixels may be predicted from an adjacent set, the distance between prediction pixels and reference pixels may always be one, regardless of the size of the current block. Thus, accuracy of intra prediction may be improved.

FIG. 3 shows an example of a 4×4 current block (e.g., a PU) and its 17 external reference pixels. Original pixels values of the current block are denoted as $Z(i,j)$, where i is a row index between 0 and 3, and j is a column index between 0 and 3. Pixels located in a row above the current block are denoted as $X(j)$ for $j=-1, \ldots, 7$. Pixels located in a column left to the current block are denoted as $Y(i)$ for $i=-1, \ldots, 7$. Note that $X(-1)$ and $Y(-1)$ denote the same reference pixel, so $X(-1)=Y(-1)$.

Prediction pixels, denoted as $P(i,j)$ for $i=0, \ldots, 3$ and $j=0, \ldots, 3$, may be generated for the current block, which may be estimates of the original pixels $Z(i,j)$. DPCM intra prediction may be fulfilled in any of a plurality of intra prediction modes (e.g., the 35 modes in FIG. 1), which may include directional modes, a DC mode and a planar mode.

To explain DPCM intra prediction in a directional mode, we define an angle of the directional mode (referred to hereafter as prediction angle and denoted as a) as an angle between the directional mode and a vertical upright direction (i.e., vertical direction pointing up, which overlaps with the vertical mode). One skilled in the art will recognize that other definitions of a may be similarly applied without departing from principles disclosed herein. As shown in FIG. 3, a represents the angle between a vertical line BA and a line CA that is drawn from a reference pixel to a prediction pixel. In HEVC, we have $\alpha=\arctan(k/32)$, wherein k has values of 0, 2, 5, 9, 13, 17, 21, 26, and 32 corresponding to the nine modes 1, 23, 13, 24, 6, 25, 14, 26, and 7, respectively. For example, k=21 for mode 14, thus $\alpha=\arctan(21/32)=33.3$ degrees. Using the angles of the nine modes 1, 23, 13, 24, 6, 25, 14, 26, and 7, the angles of the other 24 directional modes may also be determined using the symmetry features of the intra prediction modes 100. For example, since modes 14, 11, 15, and 18 are one way or another symmetrical about an axis, it can be derived that mode 11 has an angle $\alpha=-33.3$ degrees, mode 15 an angle $\alpha=33.3-90=-56.7$ degrees, and mode 18 an angle $\alpha=-33.3-90=-123.3$ degrees.

In HEVC, $\alpha$ may vary between −135 degrees and 45 degrees (i.e., $-135 \leq \alpha \leq 45$). Since $\alpha$ consistently uses a unit of degrees herein, the term "degree" may sometimes be removed after $\alpha$ (e.g., $\alpha=45$ means $\alpha=45$ degrees). Note that $\alpha>0$ when line CA is on the right side of the line BA, which applies to modes 23, 13, 24, 6, 25, 14, 26, and 7 in FIG. 1. The $\alpha=0$ for the vertical mode 4, and $\alpha<0$ when line CA is on the left side of the line BA, which applies to modes 10, 34, 18, 33, 9, 32, 17, 31, 2, 30, 16, 29, 8, 28, 15, 27, 4, 19, 11, 20, 5, 21, and 22 in FIG. 1. Depending on the range of a, different algorithms may be used to implement DPCM intra prediction. In the interest of clarity, six cases including $\alpha=45$, $0<\alpha<45$, $\alpha=0$, $-45<\alpha<0$, $\alpha=-45$, and $-135 \leq \alpha \leq -45$ will be described in the following paragraphs sequentially.

Figure 4A:
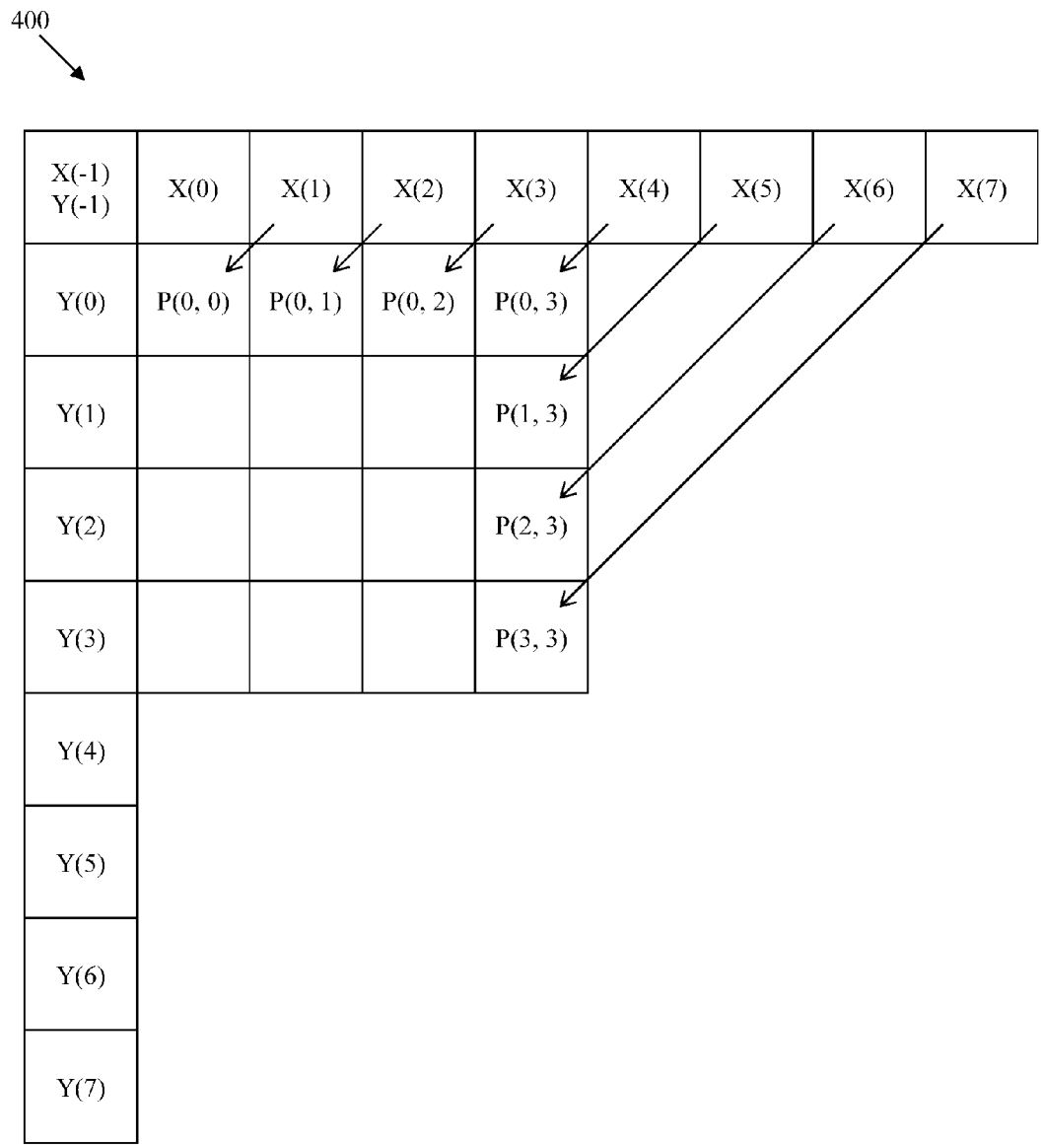

FIGS. 4A-4D shows an embodiment of an intra prediction scheme 400 in a left-down diagonal mode (numbered as mode 7 in FIG. 1 and with $\alpha=45$). For illustrative purposes, a 4×4 current block is used as an example, although the same algorithm may be applied to any suitable block size. As shown in FIG. 4A, the initial set of prediction pixels may be generated from the upper and upper-right neighboring blocks. Specifically, the top row of prediction pixels may be computed as $P(0,j)=X(j+1)$ for j=0, . . . , 3, and prediction pixels in the rightmost column may be computed as $P(i,3)=X(4+i)$ for i=1,2,3. The top row and the rightmost column may be computed simultaneously or in any sequential order. Further, a difference between the initial set of prediction pixels and the initial set of original pixels (i.e., $Z(0,j)$ for j=0, . . . , 3 and $Z(i,3)$ for i=0, . . . , 3) may be computed to generate an initial set of residual or differential pixels (denoted as $D(i,j)$). Mathematically, in the top row $D(0,j)=Z(0,j)-P(0,j)$ or $D(0,j)=P(0,j)-Z(0,j)$ for j=0, . . . , 3. In the rightmost column $D(i,3)=Z(i,3)-P(i,3)$ or $D(i,3)=P(i,3)-Z(i,3)$ for i=0, . . . , 3. The initial set of residual pixels may be processed before being used to generate an initial set of reconstructed pixels. For example, the initial set of residual pixels may go through quantization/de-quantization, which results in processed residual pixels denoted as $D'(0,j)$ for j=0, . . . , 3 and $D'(i,3)$ for i=0, . . . , 3, which may be a lossy version of the initial set of original pixels. Alternatively, in lossless coding, the initial set of residual pixels may be directly used to generate the initial set of reconstructed pixels denoted as $R(i,j)$, since $D'(0,j)=D(0,j)$ for j=0, . . . , 3 and $D'(i,3)=D(i,3)$ for i=0, . . . , 3. For example, if $D(0,j)=Z(0,j)-P(0,j)$ and $D(i,3)=Z(i,3)-P(i,3)$, then $R(0,j)=D'(0,j)+P(0,j)$ and $R(i,3)=D'(i,3)+P(i,3)$. Further, if $D'(0,j)=D(0,j)$ and $D'(i,3)=D(i,3)$ (i.e. in lossless coding), then $R(0,j)=Z(0,j)$ and $R(i,3)=Z(i,3)$. Otherwise, in lossy coding, $R(0,j)$ and $R(i,3)$ may be approximations of $Z(0,j)$ and $Z(i,3)$ respectively. As mentioned above, the reconstructed pixels, rather than the original pixels, may be used for further prediction to avoid coding drift.

Figure 4D:
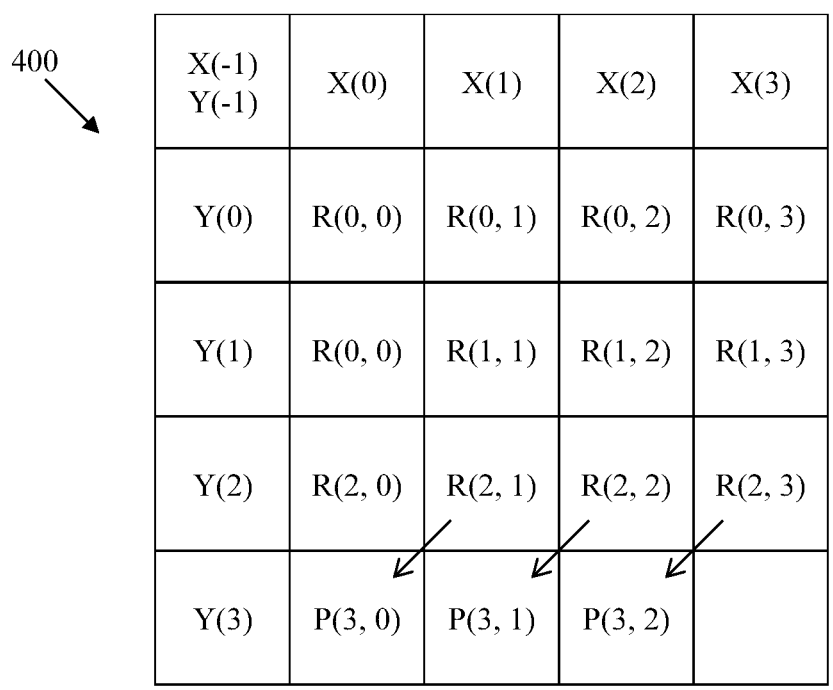

A continuing set of prediction pixels may be predicted by using reconstructed pixels within the current block as reference pixels. As shown in FIG. 4B, a second set (i.e., first continuing set) of prediction pixels including $P(1,j)$ for j=0,1,2 and $P(i,2)$ for i=1,2,3 may be computed as $P(1,j)=R(0,j+1)$ and $P(i,2)=R(i-1,3)$. In lossless coding, prediction pixels may be same with their reference original pixels, i.e., $P(1,j)=Z(0,j+1)$ and $P(i,2)=Z(i-1,3)$. In essence, each pixel in the second set may be predicted from its upper-right neighboring pixel (i.e., distance between reference pixel and prediction pixel equals one). In other words, the initial set of reconstructed pixel is in one position before the second set of prediction pixels according to a direction of the intra prediction mode. Similar to the initial set of prediction pixels, each continuing set of prediction pixels may be directly used (or processed and used) to generate reconstructed pixels, which serve as reference pixels for prediction of a next set. As shown in FIG. 4C, a third set of prediction pixels may be generated using a second set of reconstructed pixels. Specifically, $P(2,j))=R(1,j+1)$ for j=0, 1,2. Using the same algorithm, as shown in FIG. 4D, a fourth set of prediction pixels may be generated using a third set of reconstructed pixels. Specifically, $P(3,0)=R(2,1)$.

Although not shown in FIGS. 4A-4D, note that the DPCM prediction scheme may be similarly applied to any other directional mode corresponding to any other a value. For example, when $0<\alpha<45$, an initial set of prediction pixels for the current block including the top row and the rightmost column may be computed using external reference pixels. In an embodiment, the rightmost column of prediction pixels may be computed using the following equations, wherein i=0, . . . , 3:

$$u=\lfloor (i+1)\cdot\tan(\alpha) \rfloor \quad (1)$$

$$s=(i+1)\cdot\tan(\alpha)-u \quad (2)$$

$$P(i,3)=(1-s)\cdot X(3+u)+s\cdot X(3+u+1), \quad (3)$$

where $\lfloor w \rfloor$ represents a flooring operation, which obtains a greatest integer that is no greater than w. Note that intermediate variables u and s may be skipped, in which case the equations may also be expressed as one equation. In addition, the top row of prediction pixels (except the top-rightmost pixel which is included in the right most column) may be computed using the following equations, wherein j=0,1,2:

$$s=\tan(\alpha) \quad (4)$$

$$P(0,j)=(1-s)\cdot X(j)+s\cdot X(j+1). \quad (5)$$

Further, continuing sets of prediction pixels may be computed using internal reference pixels. Specifically, a prediction pixel located in a i-th row and a j-th column may be computed using the following equations, wherein i=1,2,3 and j=0,1,2:

$$s=\tan(\alpha) \quad (6)$$

$$P(i,j)=(1-s)\cdot R(i-1,j)+s\cdot R(i-1,j+1). \quad (7)$$

Note that when $0<\alpha<45$, each prediction pixel is computed as a weighted linear combination of two reference pixels that are adjacent to each other. The two reference pixels may be external or internal reference pixels, depending on the location of the prediction pixel. Further, for each prediction pixel, two weights of the two reference pixel depend on $\alpha$, and the two weights add up to equal one. For example, if $0<\alpha<45$, in equation (7), a first weight of a first internal reference pixel R(i−1, j) equals (1−tan($\alpha$)) and a second weight of a second internal reference pixel R(i−1, j+1) equals tan($\alpha$).

In fact, it can be seen that $\alpha=45$ may be considered a special case of the general equations (1) to (7). Specifically, for prediction pixels in the rightmost column, we may derive the following equations, wherein i=0, . . . , 3:

$$u=\lfloor(i+1)\cdot\tan(\alpha)\rfloor=i+1 \qquad (8)$$

$$s=(i+1)\cdot\tan(\alpha)-u=i+1-(i+1)=0 \qquad (9)$$

$$P(i,3)=(1-s)\cdot X(3+u)+s\cdot X(3+u+1)=X(3+i+1)=X(i+4). \qquad (10)$$

In addition, for prediction pixels in the top column, we may derive the following equations, wherein j=0,1,2:

$$s=\tan(\alpha)=1 \qquad (11)$$

$$P(0,j)=(1-s)\cdot X(j)+s\cdot X(j+1)=X(j+1). \qquad (12)$$

In addition, for a prediction pixel located in a i-th row and a j-th column, wherein i=1,2,3 and j=0,1,2, we may derive the following equations:

$$s=\tan(\alpha)=1 \qquad (13)$$

$$P(i,j)=(1-s)\cdot R(i-1,j)+s\cdot R(i-1,j+1)=R(i-1,j+1). \qquad (14)$$

It can be seen that the equations (10), (12), and (14) represent the same algorithm as the DPCM intra prediction scheme shown in FIG. 4 for the case when $\alpha=45$.

When $\alpha=0$, the intra prediction is in the vertical mode, and the prediction pixels may be computed as P(0,j)=X(j) for j=0,1,2,3 and P(i,j)=R(i−1,j) for i=1,2,3 and j=0,1,2,3.

When $-45<\alpha<0$, an initial set of prediction pixels for the current block including the top row and the leftmost column may be computed using external reference pixels. In this case, the external reference pixels (denoted as Y(i)) are located in neighboring blocks to the left of the current block. In an embodiment, the leftmost column of prediction pixels may be computed using the following equations, wherein i=0, . . . , 3:

$$u=\lfloor(i+1)\cdot\tan(-\alpha)\rfloor \qquad (15)$$

$$s=(i+1)\cdot\tan(-\alpha)-u \qquad (16)$$

$$P(i,0)=(1-s)\cdot Y(\lfloor(-u+1)\cdot\tan^{-1}(\alpha)\rfloor-1)+s\cdot Y(\lfloor(-u)\cdot\tan^{-1}(\alpha)\rfloor-1). \qquad (17)$$

In addition, the top row of prediction pixels (except the top-leftmost pixel which is included in the leftmost column) may be computed using the following equations, wherein j=1,2,3:

$$s=\tan(-\alpha) \qquad (18)$$

$$P(0,j)=(1-s)\cdot X(j)+s\cdot X(j-1). \qquad (19)$$

Further, continuing sets of prediction pixels may be computed using internal reference pixels. Specifically, a prediction pixel located in a i-th row and a j-th column may be computed using the following equations, wherein i=1,2,3 and j=1,2,3:

$$s=\tan(-\alpha) \qquad (20)$$

$$P(i,j)=(1-s)\cdot R(i-1,j)+s\cdot R(i-1,j-1). \qquad (21)$$

It can be seen that $\alpha=-45$ may be considered a special case of the equations (15) to (21). Specifically, for prediction pixels in the leftmost column, we may derive the following equations, wherein i=0, . . . , 3:

$$u=\lfloor(i+1)\cdot\tan(-\alpha)\rfloor=i+1 \qquad (22)$$

$$s=(i+1)\cdot\tan(-\alpha)-u=i+1-(i+1)=0 \qquad (23)$$

$$P(i,0) = (1-s)\cdot Y(\lfloor(-u+1)\cdot\tan^{-1}(\alpha)\rfloor-1) + \qquad (24)$$
$$s\cdot Y(\lfloor(-u)\cdot\tan^{-1}(\alpha)\rfloor-1)$$
$$= Y(\lfloor(-i)\cdot(-1)\rfloor-1) = Y(i-1).$$

In addition, for prediction pixels in the top column, we may derive the following equations, wherein j=1,2,3:

$$s=\tan(-\alpha)=1 \qquad (25)$$

$$P(0,j)=(1-s)\cdot X(j)+s\cdot X(j-1)=X(j-1) \qquad (26)$$

In addition, for a prediction pixel located in a i-th row and a j-th column, wherein i=1,2,3 and j=1,2,3, we may derive the following equations:

$$s=\tan(-\alpha)=1 \qquad (27)$$

$$P(i,j)=(1-s)\cdot R(i-1,j)+s\cdot R(i-1,j-1)=R(i-1,j-1). \qquad (28)$$

When $-135\leq\alpha\leq-45$, the current block and its external reference pixels may be transposed, after which the DPCM intra prediction scheme described above may be applied. FIG. 5 shows an example of a transposed 4×4 block and its transposed external reference pixels, which originated from the block and external reference pixels shown in FIG. 3. As shown in FIG. 5, transposing may switch the rows and columns of the current block and its external reference pixels. In effect, it may be considered that transposing rotated the image space by 90 degrees (i.e., increased a by 90 degrees), thus the range of $-135\leq\alpha\leq-45$ may now be $-45\leq\alpha\leq45$. After transposing, one skilled in the art will recognize that the DPCM intra prediction scheme described with respect to FIGS. 4A-4D may be similarly applied to generate all prediction pixels for the current block. Further, if the original definition of a is changed, e.g., having the horizontal mode (mode 2 in FIG. 1) as $\alpha=0$, then algorithms/equations and transposing schemes may be adjusted accordingly. Note that if the transpose is performed in an encoder for $-135\leq\alpha\leq-45$, this operation may be taken into account in the corresponding decoder. That is, a same type of transpose operation may be performed in the decoder for $-135\leq\alpha\leq-45$. Alternatively, the prediction pixels may be computed without a matrix transpose so long as the coding order is modified to follow the vertical direction, as opposed to the horizontal direction. The decoder be consistent with the encoder in this scenario.

It should be noted that embodiments of the disclosed DPCM scheme may be applied to any N×N block. In an embodiment, when $-45\leq\alpha\leq45$, intra prediction may be implemented using the following algorithm, wherein similar equations may be used when $-135\leq\alpha\leq-45$ after transposing the current block and its external reference pixels.

1. if α=45, for i=0, ... ,N−1, P(i,N−1)=X(i+N); (29)

for j=0, ... ,N−2, P(0,j)=X(j+1); and (30)

for i=1, ... ,N−1 and j=0, ... ,N−2, P(i,j)=R(i−1,j+1). (31)

2. if 0≤α≤45:

for i=0, ... ,N−1, u=⌊(i+1)·tan(α)⌋, (32)

s=(i+1)·tan(α)−u, (33)

P(i, N−1)=(1−s)·X(N−1+u)+s·X(N−1+u+1); (34)

for j=0, ... ,N−2, P(0,j)=(1−tan(α))·X(j)+tan(α)·X(j+1); (35)

for i=1, ... ,N−1 and j=0, ... ,N−2, P(i,j)=(1−tan(α))·R(i−1,j)+tan(α)·R(i−1,j+1). (36)

3. if α=0:

for j=0, ... ,N−1, P(0,j)=X(j); (37)

for i=1, ... ,N−1 and j=0, ... ,N−1, P(i,j)=R(i−1,j). (38)

4. if −45<α<0:

for i=0, ... ,N−1, u=⌊(i+1)·tan(−α)⌋, (39)

s=(i+1)·tan(−α)−u, (40)

$P(i, 0)=(1−s)\cdot Y(\lfloor(−u+1)\cdot\tan^{−1}(\alpha)\rfloor−1)+s\cdot Y(\lfloor(−u)\cdot\tan^{−1}(\alpha)\rfloor−1);$ (41)

for j=1, ... ,N−1, P(0,j)=(1−tan(−α))·X(j)+tan(−α)·X(j−1); (42)

for i=1, ... ,N−1 and j=1, ... ,N−1, P(i,j)=(1−tan(−α))·R(i−1,j)+tan(−α)·R(i−1,j−1). (43)

5. if α=−45:

for i=0, ... ,N−1, P(i, 0)=Y(i−1); (44)

for j=1, ... ,N−1, P(0,j)=X(j−1); and (45)

for i=1, ... ,N−1 and j=1, ... ,N−1, P(i,j)=R(i−1,j−1). (46)

Note that when 0<α<45 or −45<α<0, each prediction pixel is computed as a weighted linear combination of two adjacent reference pixels. The two reference pixels may be external or internal reference pixels, depending on the location of the prediction pixel. Further, for each prediction pixel, two weights of the two reference pixel depend on α, and the two weights add up to equal one. For example, if 0<α<45, in equation (35), a first weight of a first external reference pixel X(j) equals (1−tan(α)) and a second weight of a second external reference pixel X(j+1) equals tan(α).

In the present disclosure, each computed predicted pixel in a continuing set may be based on an adjacent reference pixel. For example, in the diagonal mode 7 as shown in FIG. 1, except some prediction pixels in the initial set may be separated from their external reference pixels, all other prediction pixels are computed from their respective upper-right neighboring pixels located within the current block. The distance between each prediction pixel and its corresponding internal reference pixel may remain one regardless of the size of the current block. As a result, accuracy of intra prediction may be improved, and bit-rate needed to represent the residual pixels may be reduced. Further, the DPCM prediction schemes/methods disclosed herein may be applied to both luma and chroma components. There may be no need to modify any syntax of the HEVC draft. However, the encoding/decoding process for intra prediction may be modified as described above.

As mentioned above, intra prediction may also be implemented using a non-directional mode, such as the DC and planar mode described in FIG. 1. In the existing DC and planar modes, all prediction pixels may be generated from external reference pixels. Consequently, the accuracy of intra prediction may depend on a block size and a distance between a prediction pixel and its reference pixels. To address this issue, the present disclosure teaches local pixel-based intra prediction schemes, which may be implemented to replace the currently used DC and/or planar modes. Alternatively, the disclosed intra prediction schemes may be added as new prediction modes to existing intra prediction modes.

FIG. 6 illustrates an example of a pixel and its left and upper neighboring pixels. In the disclosed pixel-based intra prediction schemes, local spatial similarities between the pixel, denoted as X, and its four neighboring pixels, denoted as A, B, C, and D, may be fully utilized. X represents an original pixel value, while A, B, C, and D represent reconstructed values of the neighboring pixels. Note that the pixels X, A, B, C, and D may be located in a same block or different blocks. A prediction value of the pixel X, denoted as P(X), may be computed using various predictors such as a local mean predictor, a local median predictor, or a local adaptive predictor. In an embodiment of a local mean predictor, the prediction pixel may be computed via equation:

P(X)=(A+B+C+D)/4. (47)

In an embodiment of a local median predictor, the prediction pixel may be computed via equation:

P(X)=median(A,B,C,D). (48)

Suppose that A<B<C<D, according to equation (48), P(X) may take an average of two middle values. For example, $$P(X) = \text{round}\frac{(B + C)}{2}.$$

In an embodiment of a local adaptive predictor, the prediction pixel may be computed via equation:

$$P(X) = \begin{cases} \min(A, B) & \text{if } C \geq \max(A, B) \\ \max(A, B) & \text{if } C \leq \min(A, B) \\ A + B - C & \text{else} \end{cases} \quad (49)$$

In the various predictors, the prediction pixel may be computed adaptively based on its left and upper neighboring pixels. In other words, the prediction pixel may be generated to have similar values to its adjacent neighbors. Regardless of the size of the current block, and regardless of the position of pixel X in the current block, P(X) may be generated from its adjacent reference pixels, wherein a distance between pixel X and each of its reference pixels is one. Thus, the accuracy of intra prediction may be improved compared with the current DC mode. Further, the implementation of the disclosed pixel-based predictors may be relatively simpler than the currently planar mode.

As mentioned previously, the DPCM or pixel-based intra prediction schemes disclosed herein may be implemented in a variety of coding schemes. Depending on the application, lossy (i.e., with distortion or information loss) and/or lossless (i.e., no distortion or information loss) encoding may be implemented in a video encoder. For example, when encoding a video frame or slice, the video encoder may bypass or skip a transform step and/or a quantization step for some or all of blocks in the video frame. Herein, a lossy encoding mode may include quantization without transform encoding (i.e., bypassing a transform step), and the lossless encoding mode may include transform bypass encoding (i.e., bypassing a transform step and a quantization step) and transform without quantization encoding (i.e., bypassing a quantization step), in which the transform operation is invertible or lossless. Likewise, based on information contained in a received bitstream, a video decoder may decode a video frame using a lossless mode and/or a lossy mode. The lossy decoding mode may include quantization without transform decoding, and the lossless decoding mode may include transform bypass decoding and transform without quantization decoding.

Depending on whether a coding scheme is lossless or lossy, a reconstructed pixel may be an exact or lossy version of an original pixel. Since the reconstructed pixel may be used as a reference pixel for intra prediction of other pixels, accuracy of intra prediction may vary with the lossless/lossy scheme. Further, since coding modules used in a lossless and a lossy scheme may be different, the disclosed DPCM intra prediction may be implemented differently. In the interest of clarity, the application of various embodiments of DPCM intra prediction in lossy and lossless coding schemes are described in paragraphs below.

Figure 7:
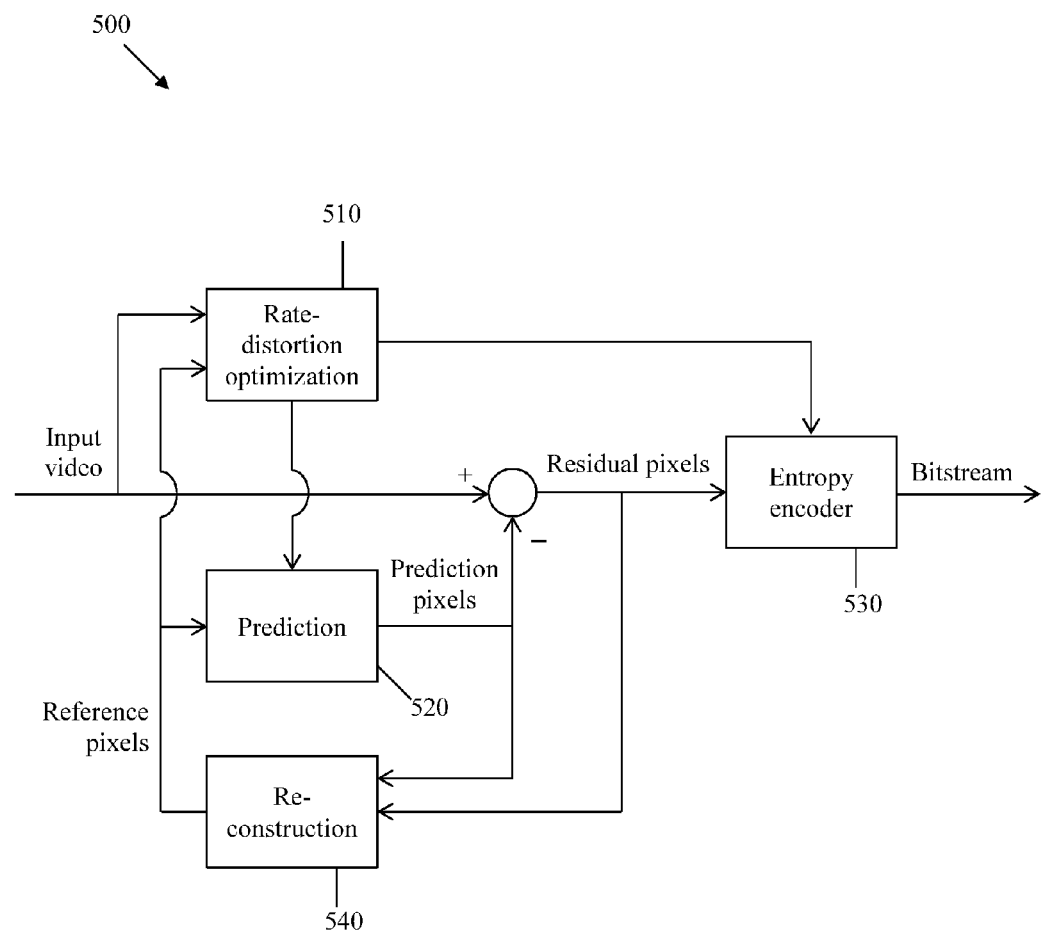
FIG. 7 is a schematic diagram of an embodiment of a transform bypass encoding scheme.

FIG. 7 illustrates an embodiment of a transform bypass encoding scheme 500, which may be implemented in a video encoder. The transform bypass encoding scheme 500 may comprise a rate-distortion optimization (RDO) module 510, a prediction module 520, an entropy encoder 530, and a reconstruction module 540 arranged as shown in FIG. 5. In operation, an input video comprising a sequence of video frames (or slices) may be received by the encoder. Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 510 may be configured to make logic decisions for one or more of other modules. For example, the RDO module 510 may coordinate the prediction module 520 by determining an optimal intra prediction mode for a current block (e.g., a PU) from a plurality of available prediction modes. The RDO module 510 may select an optimal intra mode based on various algorithms. For example, the RDO module 510 may calculate a SAD for each prediction mode, and select a prediction mode that results in the smallest SAD. The disclosed pixel-based intra prediction may be implemented to replace one or more existing intra prediction modes. Alternatively, they may be added as new prediction modes to accompany the existing modes.

Based on logic decisions made by the RDO module 510, the prediction module 520 may utilize both external reference pixels and internal reference pixels to generate prediction pixels for the current block, according to embodiments of the pixel-based intra prediction schemes disclosed herein. Each prediction pixel may be subtracted from a corresponding original pixel in the current block, thereby generating a residual pixel. To facilitate continuous encoding of pixels, the residual pixels may also be fed into the reconstruction module 540, which may generate reconstructed pixels to serve as reference pixels for intra prediction of future pixels. Furthermore, after de-blocking filter operation and other in-loop filter operation such as sample adaptive offset operation, the modified reconstructed pixels can serve as reference pixels for inter prediction of future pixels.

Then, after all residual pixels have been generated for the current block, the residual pixels may be scanned, and non-zero residual pixels may be encoded by the entropy encoder 530 into an encoded bitstream. The entropy encoder 530 may employ any entropy encoding scheme, such as context-adaptive binary arithmetic coding (CABAC) encoding, truncated Golome-Rice (TR) coding, exponential Golomb (EG) encoding, or fixed length encoding, or any combination thereof. In the transform bypass encoding scheme 500, since the residual block is encoded without a transform step or a quantization step, no information loss may be induced in the encoding process. It should be noted that FIG. 7 may be a simplified illustration of a video encoder, thus it may only include a portion of modules present in the encoder. Other modules (e.g., filter, scanner, and transmitter), although not shown in FIG. 7, may also be included to facilitate video encoding. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

When encoding an N×N current block via the transform bypass encoding scheme 500, since a residual pixel (i.e., $D(i,j)$ for $i=0, \ldots, N-1$ and $j=0 \ldots, N-1$) may be directly added to a prediction pixel (i.e., $P(i,j)$) to generate a reconstructed pixel (e.g., $R(ij)=D(ij)+P(ij)$) without any additional processing, no distortion or information loss may be induced in the reconstruction process. Consequently, the reconstructed pixel ($R(i,j)$) may be exactly the same with the original pixel ($Z(i,j)$). In an embodiment, an initial set of predicted pixels may be generated based on a set of external reference pixels, while a continuing set of predicted pixels may be generated based on a set of internal reference pixels, which are previously reconstructed pixels. For example, in a diagonal mode (i.e., mode 4 in FIG. 1), the 0-th row of the current block may be predicted from an upper block and an upper-corner pixel as $P(0,j)=X(j-1)$ for $j=0 \ldots, N-1$, and the 0th column of the current block may be predicted from a left block as $P(i,0)=Y(i-1)$ for $i=1 \ldots, N-1$. After generating the initial set of prediction pixels, the initial set may be subtracted from their corresponding original pixels, thereby generating an initial set of residual pixels. Further, the set of residual pixels may be directly used to generated a set of reconstructed pixels. A continuing set of prediction pixels may be computed from a set of reconstructed pixels as $P(i,j)=R(i-1,j-1)$ for $i=1, \ldots, N-1$ and $j=1, \ldots, N-1$.

Figure 8:
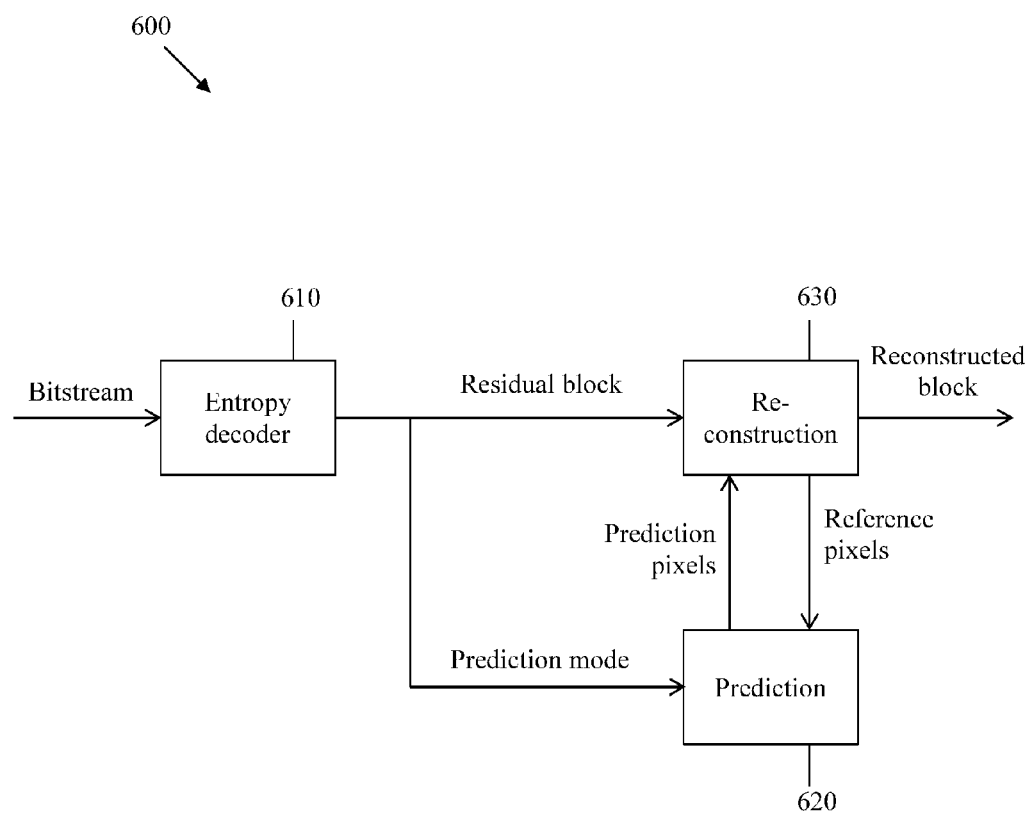
FIG. 8 is a schematic diagram of an embodiment of a transform bypass decoding scheme.

FIG. 8 illustrates an embodiment of a transform bypass decoding scheme 600, which may be implemented in a video decoder. The transform bypass decoding scheme 600 may correspond to the transform bypass encoding scheme 500, and may comprise an entropy decoder 610, a prediction module 620, and a reconstruction module 630 arranged as shown in FIG. 6. In operation, an encoded bitstream containing information of a sequence of video frames may be received by the entropy decoder 610, which may decode the bitstream to an uncompressed format. The entropy decoder 610 may employ any entropy decoding algorithm, such as CABAC decoding, TR coding, EG decoding, or fixed length encoding, or any combination thereof.

For a current block being decoded, a residual block may be generated after the execution of the entropy decoder 610. In addition, information containing a prediction mode of the current block may also be decoded by the entropy decoder 610. Then, based on the prediction mode as well as a plurality of external reference pixels located in one or more previously decoded neighboring blocks, the prediction module 620 may generate an initial set of prediction pixels. Then, the reconstruction module 630 may combine the initial set of prediction pixels with a corresponding set of residual pixels to generate an initial set of reconstructed pixels. The initial set of reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

In use, if an original block is encoded and decoded using lossless schemes, such as the transform bypass encoding scheme 500 and the transform bypass decoding scheme 600, it is possible that no information loss may be induced in the entire coding process. Thus, barring distortion caused during transmission, a reconstructed block may be exactly the same with the original block.

Figure 9:
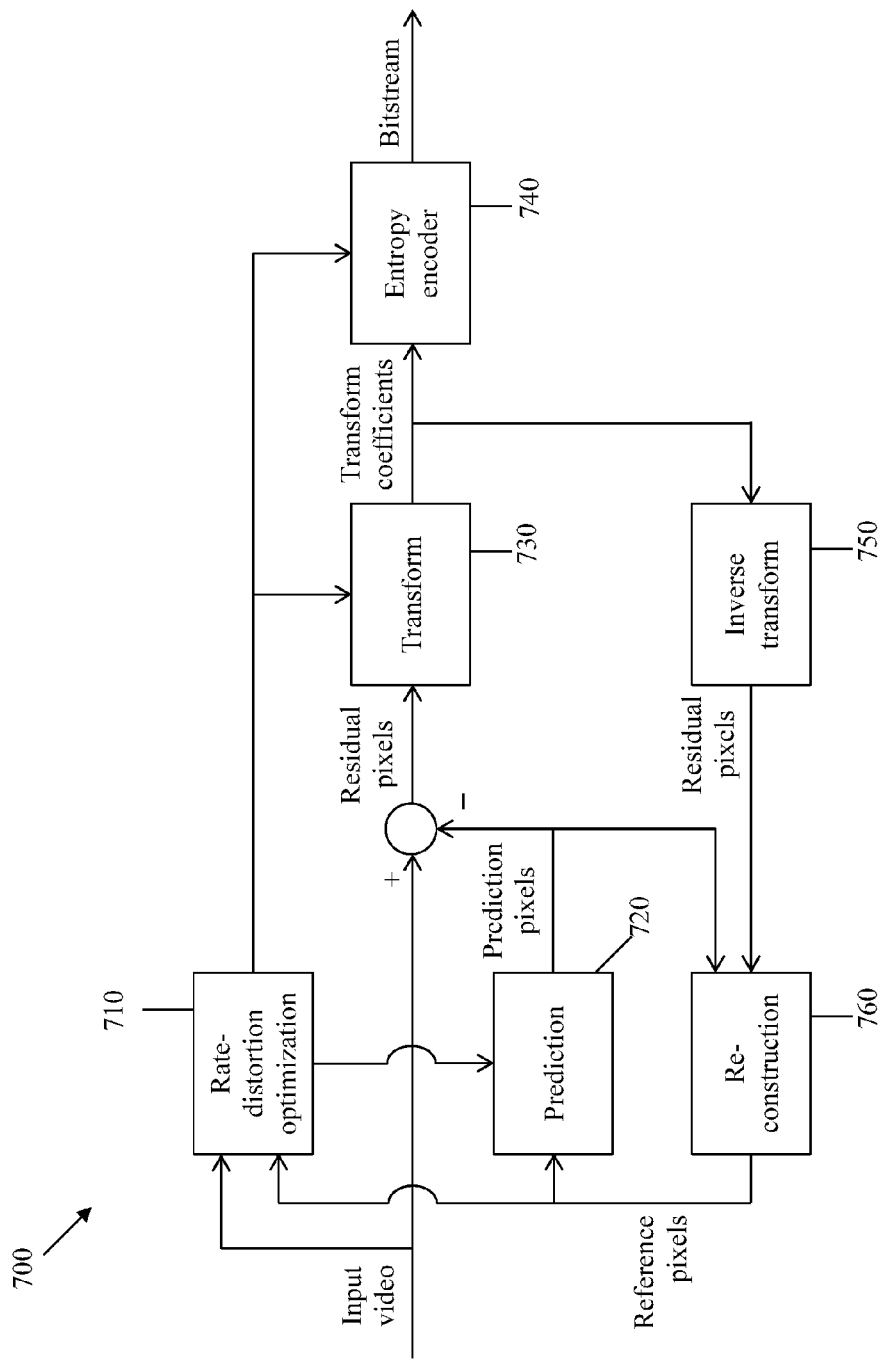
FIG. 9 is a schematic diagram of an embodiment of a transform without quantization encoding scheme.

During lossless coding of certain blocks in a video frame, sometimes it may be desirable to include a transform step into the coding process, if the transform operation is invertible (i.e., after transform and inverse transform operations, the input pixel values equal the output pixel values). For example, for some blocks of a text region, an added transform step may generate a shorter bitstream compared to a transform bypass coding scheme. FIG. 9 illustrates an embodiment of a transform without quantization encoding scheme 700, which may comprise a RDO module 710, a prediction module 720, a transform module 730, an entropy encoder 740, an inverse transform module 750, and a reconstruction module 760. Some aspects of the transform without quantization encoding scheme 700 may be the same or similar to the transform bypass encoding scheme 500 in FIG. 5, thus the similar aspects will not be further described in the interest of conciseness.

The transform without quantization encoding scheme 700 may be implemented in a video encoder, which may receive an input video comprising a sequence of video frames. The RDO module 710 may be configured to control one or more of other modules, and may be the same or similar to the RDO module 510 in FIG. 7. Based on logic decisions made by the RDO module 710, the prediction module 720 may utilize both external and internal reference pixels to generate prediction pixels for a current block. Each prediction pixel (P(i,j)) may be subtracted from a corresponding original pixel in the current block, thereby generating a residual pixel. The prediction module 720 may be the same or similar to the prediction module 520 in FIG. 7.

An initial set of residual pixels may be generated by the prediction module 720 based on a plurality of external reference pixels. Then, the initial set of residual pixels may be first transformed from a spatial domain to a frequency domain by the transform module 730, which may be implemented using any invertible transform. For example, in a diagonal mode (i.e., mode 4 in FIG. 1), residual pixels, denoted as D(0j) where j is between 0 and N−1, in the 0-th row may be transformed using an invertible transform. At this time, since residual pixels in other rows/columns have not yet been made available by the prediction module 720, the other rows/columns may be arbitrarily assigned or filled or padded with appropriate pixel values. For example, the other rows may be simply assigned with zero pixel values. After obtaining an N×N block comprising the initial set of residual pixels as well as arbitrarily assigned values, the invertible transform may be applied onto the N×N block to generate a transform coefficient matrix. Alternatively, linear or one-dimensional transform may also be performed on the 0-th row. Further, in the diagonal mode, the 0-th column comprising N pixels (including D(0,0)) or N−1 pixels (excluding D(0,0)) may be similarly transformed.

To facilitate encoding of continuing sets in the current block, the transform coefficient matrix may be fed into the inverse transform module 750, which may perform the inverse of the transform module 730 and convert transform coefficients from a frequency domain to a spatial domain. Since the transform is fully invertible, we may have D'(0j)=D(0j). Thus, D'(0,j) may be used by the reconstruction module 760 to generate a set of reconstructed pixels as R(0,j)=D'(0j)+P(0j)=Z(0j), where j is between 0 and N−1. D'(i,0) may be used by the reconstruction module 760 to generate a set of reconstructed pixels as R(i,0)=D'(i,0)+P(i,0)=Z(i,0), where i is between 1 and N−1. Then, R(0,j) may serve as internal reference pixels to generate a second set of prediction pixels as P(1,j)=R(0,j−1), where j is between 0 and N−1. A second set of residual pixels D(1,j) may again be generated. Other pixels may be assigned with arbitrary values and the constructed N×N block may be transformed and inverse transformed, generating a block containing D'(1,j). D'(1,j) may then serve as internal reference pixels for continuing intra prediction. This iterative process may continue until all residual pixels have been generated for the current block. Certain aspects of this iterative prediction process may be similar to the process in the transform bypass encoding scheme 500, thus the similar aspects will not be further described in the interest of conciseness. The transform (e.g., in transform module 730) may be a one-dimensional "line-transform" either in a vertical or horizontal direction, and the transform may be performed one row or column at a time. DPCM prediction may be performed without drift in a transform without quantization scheme when the transform is fully invertible.

Alternatively, since the transform operation is invertible, the reconstructed pixels are the same as the original pixels. Accordingly, the original pixels may be used as reference pixels, and the transform/inverse transform steps may be performed after all residual pixels in the current block have been generated. In this case, there may be no need to transform each set of residual pixels separately, which simplifies the encoding process.

After all transform coefficients have been generated for the current block, the transform coefficients may be scanned, and non-zero transform coefficients may be encoded by the entropy encoder 740 into an encoded bitstream. The entropy encoder 740 may be the same or similar with the entropy encoder 530. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 10:
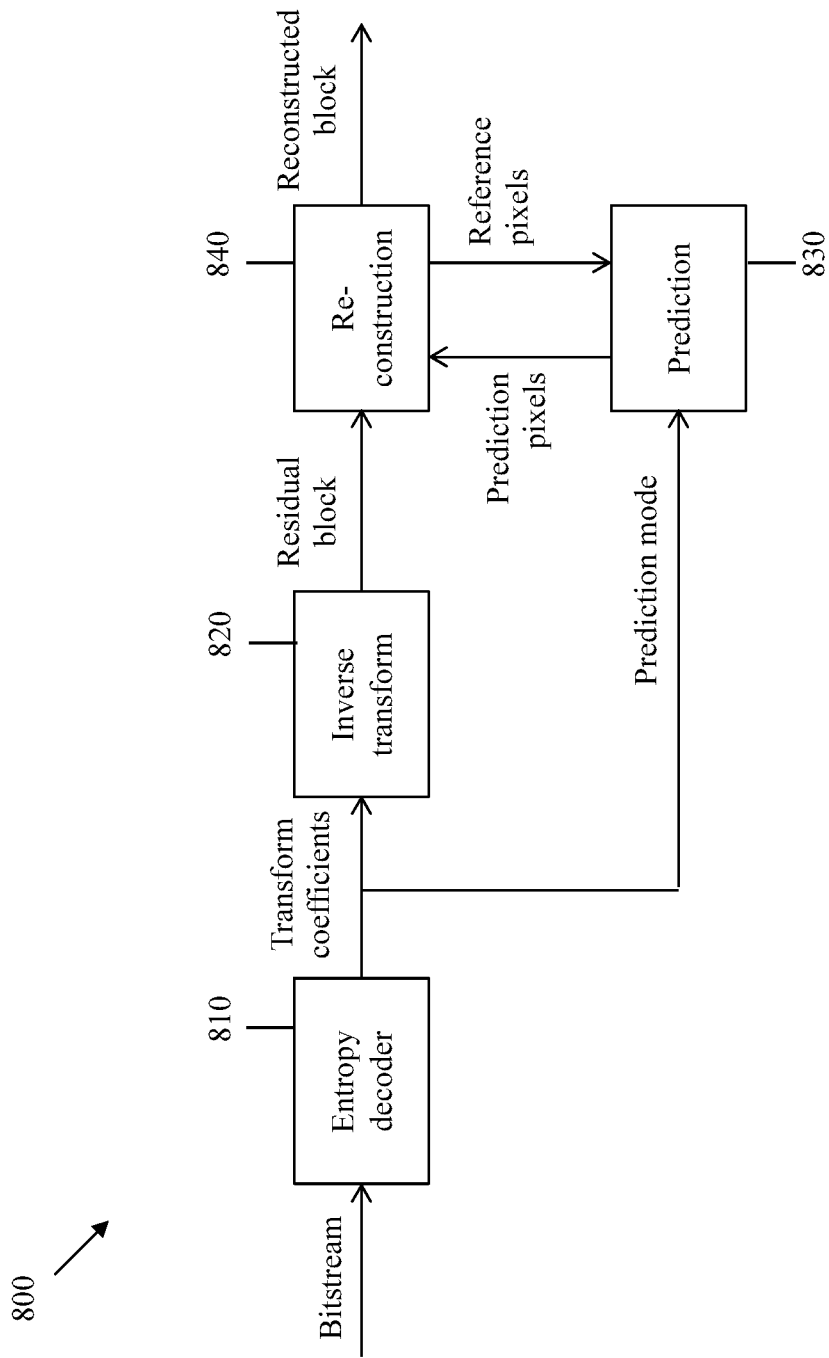
FIG. 10 is a schematic diagram of an embodiment of a transform without quantization decoding scheme.

FIG. 10 illustrates an embodiment of a transform without quantization decoding scheme 800, which may be implemented in a video decoder. The transform bypass decoding scheme 800 may correspond to the transform without quantization encoding scheme 700, and may comprise an entropy decoder 810, an inverse transform module 820, a prediction module 830, and a reconstruction module 840 arranged as shown in FIG. 10. In operation, an encoded bitstream containing information of a sequence of video frames may be received by the entropy decoder 810, which may decode the bitstream to an uncompressed format. The entropy decoder 810 may be the same or similar to the entropy decoder 610 in FIG. 8. After execution of the entropy decoder 810, a matrix of transform coefficients may be generated, which may then be fed into the inverse transform module 820. The inverse transform module 820 may convert the transform coefficients in a frequency domain to residual pixel values in a spatial domain. The inverse transform module 820 may be the same or similar with the inverse transform module 750 in FIG. 7.

For a current block being decoded, a residual block may be generated after the execution of the inverse transform module 820. In addition, information containing a prediction mode of the current block may also be decoded by the entropy decoder 810. Then, based on the prediction mode as well as a plurality of external reference pixels located in one or more previously decoded neighboring blocks, the prediction module 830 may generate an initial set of prediction pixels. Then, the reconstruction module 840 may combine the initial set of prediction pixels with a corresponding set of residual pixels to generate a set of reconstructed pixels. The reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

Figure 11:
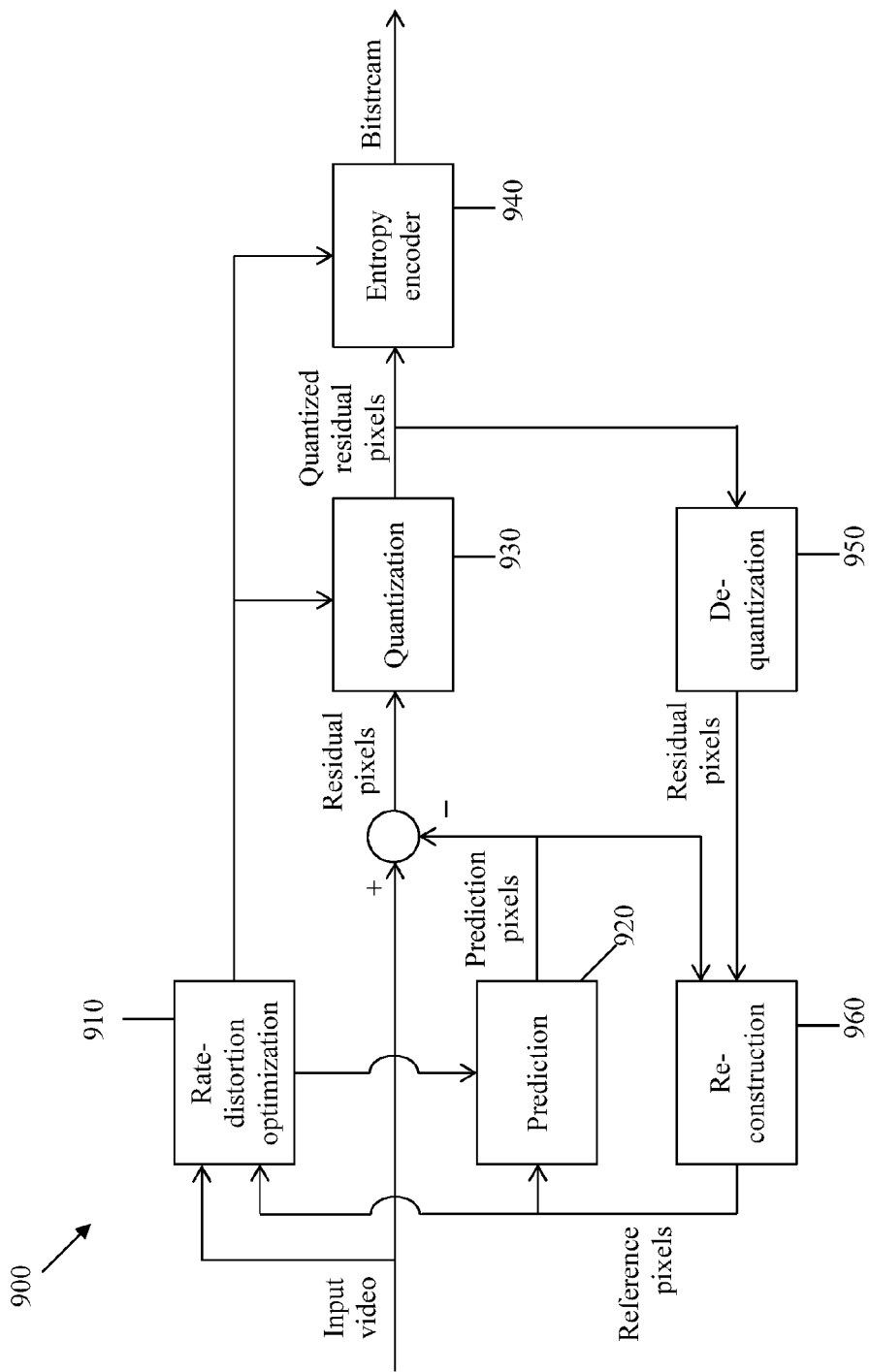
FIG. 11 is a schematic diagram of an embodiment of a quantization without transform encoding scheme.

In use, sometimes it may be desirable to include a quantization step, instead of a transform step, into the coding process. FIG. 11 illustrates an embodiment of a quantization without transform encoding scheme 900, which may comprise a RDO module 910, a prediction module 920, a quantization module 930, an entropy encoder 940, a de-quantization module 950, and a reconstruction module 960. Some aspects of the quantization without transform encoding scheme 900 may be the same or similar to the transform bypass encoding scheme 500 in FIG. 7 or the transform without quantization encoding scheme 700 in FIG. 9, thus the similar aspects will not be further described in the interest of clarity.

The quantization without transform encoding scheme 900 may be implemented in a video encoder, which may receive an input video comprising a sequence of video frames. The RDO module 910 may be configured to control one or more of other modules, and may be the same or similar to the RDO module 510 in FIG. 7. Based on logic decisions made by the RDO module 910, the prediction module 920 may utilize both external and internal reference pixels to generate prediction pixels for a current block. Each prediction pixel ($P(i,j)$) may be subtracted from a corresponding original pixel in the current block, thereby generating a residual pixel. The prediction module 920 may be the same or similar to the prediction module 720 in FIG. 9.

An initial set of residual pixels may be generated by the prediction module 920 based on a plurality of external reference pixels. Then, the initial set of residual pixels may be first quantized or re-scaled by the quantization module 930 to generate an initial set of quantized residual pixels. Depending on the application, the quantization module 930 may employ any appropriate quantization parameter (QP). For example, in a vertical intra mode, residual pixels, denoted as $D(0,j)$ where j is between 0 and N−1, in the 0-th row may be converted to quantized residual pixels, denoted as $q\_D(0,j)$. The quantization may use equation $q\_D(0,j)=\text{floor}(d(0,j)/qp\text{ scale})$, where qp scale denotes a quantation step determined by the QP.

To facilitate encoding of other rows in the current block, the initial set of quantized residual pixels may be fed into the de-quantization module 950, which may perform the inverse of the quantization module 930 and recover a scale of the residual pixels. The de-quantization module 950 may generate another set of residual pixels, denoted as $D''(0,j)$ where j is between 0 and N−1 via an equation: $D''(0,j)= q\_D(0,j)*qp\_scale=\text{floor}(d(0,j)/qp\_scale)*qp\_scale$. $D''(0j)$, a lossy version of $D(0,j)$, may be used by the reconstruction module 960 to generate a set of reconstructed pixels as $R(0,j)=D''(0,j)+P(0,j)$. Then, the 0-th row of reconstructed pixels $R(0j)$ may serve as internal reference pixels to generate a second set (i.e., a 1-st row) of prediction pixels as $P(1,j)=R(0,j)$. A second set of residual pixels $D(1,j)$ may again be generated, quantized and de-quantized, generating a block containing $D''(1,j)$ and a block containing the reconstructed pixels $R(1,j)=D''(1,j)+P(1,j)$ for $j=0, \ldots, N-1$. $R(1,j)$ may then serve as internal reference pixels for continuing intra prediction. This iterative process may continue until all residual pixels have been generated for the current block. Certain aspects of this iterative prediction process may be similar to the process in the transform bypass encoding scheme 500, thus the similar aspects will not be further described in the interest of conciseness.

After all quantized residual pixels have been generated for the current block, the quantized residual pixels may be scanned, and non-zero quantized residual pixels may be encoded by the entropy encoder 940 into an encoded bitstream. The entropy encoder 940 may be the same or similar with the entropy encoder 530. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 12:
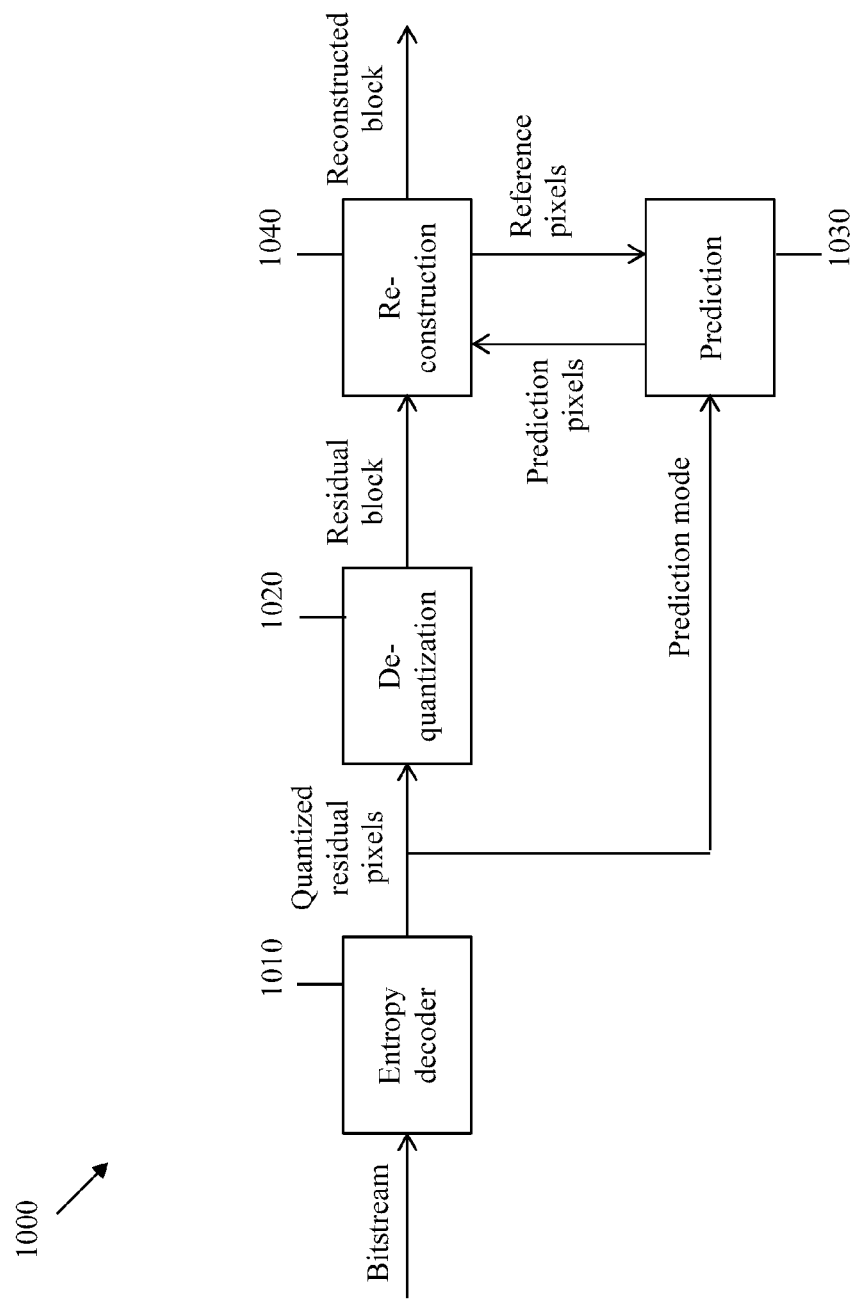
FIG. 12 is a schematic diagram of an embodiment of a quantization without transform decoding scheme.

FIG. 12 illustrates an embodiment of a quantization without transform decoding scheme 1000, which may be implemented in a video decoder. The transform bypass decoding scheme 1000 may correspond to the quantization without transform encoding scheme 900, and may comprise an entropy decoder 1010, a de-quantization module 1020, a prediction module 1030, and a reconstruction module 1040 arranged as shown in FIG. 12. In operation, an encoded bitstream containing information of a sequence of video frames may be received by the entropy decoder 1010, which may decode the bitstream to an uncompressed format. The entropy decoder 1010 may be the same or similar to the entropy decoder 610 in FIG. 8. After execution of the entropy decoder 1010, a block of quantized residual pixels may be generated, which may then be fed into the de-quantization module 1020. The de-quantization module 1020 may be the same or similar with the de-quantization module 950 in FIG. 11.

For a current block being decoded, a residual block may be generated after the execution of the de-quantization module 1020. In addition, information containing a prediction mode of the current block may also be decoded by the entropy decoder 1010. Then, based on the prediction mode as well as a plurality of external reference pixels located in one or more previously decoded neighboring blocks, the prediction module 1030 may generate an initial set of prediction pixels. Then, the reconstruction module 1040 may combine the initial set of prediction pixels with a corresponding set of residual pixels to generate a set of reconstructed pixels. The reconstructed pixels may also serve as reference pixels for decoding of continuing sets of pixels. Specifically, by using the initial set of reconstructed pixels, a second set of prediction pixels may be generated. Thus, the second set of prediction pixels may be added to a second set of residual pixels to obtain a second set of reconstructed pixels. This iterative process may continue until all reconstructed pixels for the current block have been obtained. Then, the decoder may proceed to reconstruct a next block.

Figure 13:
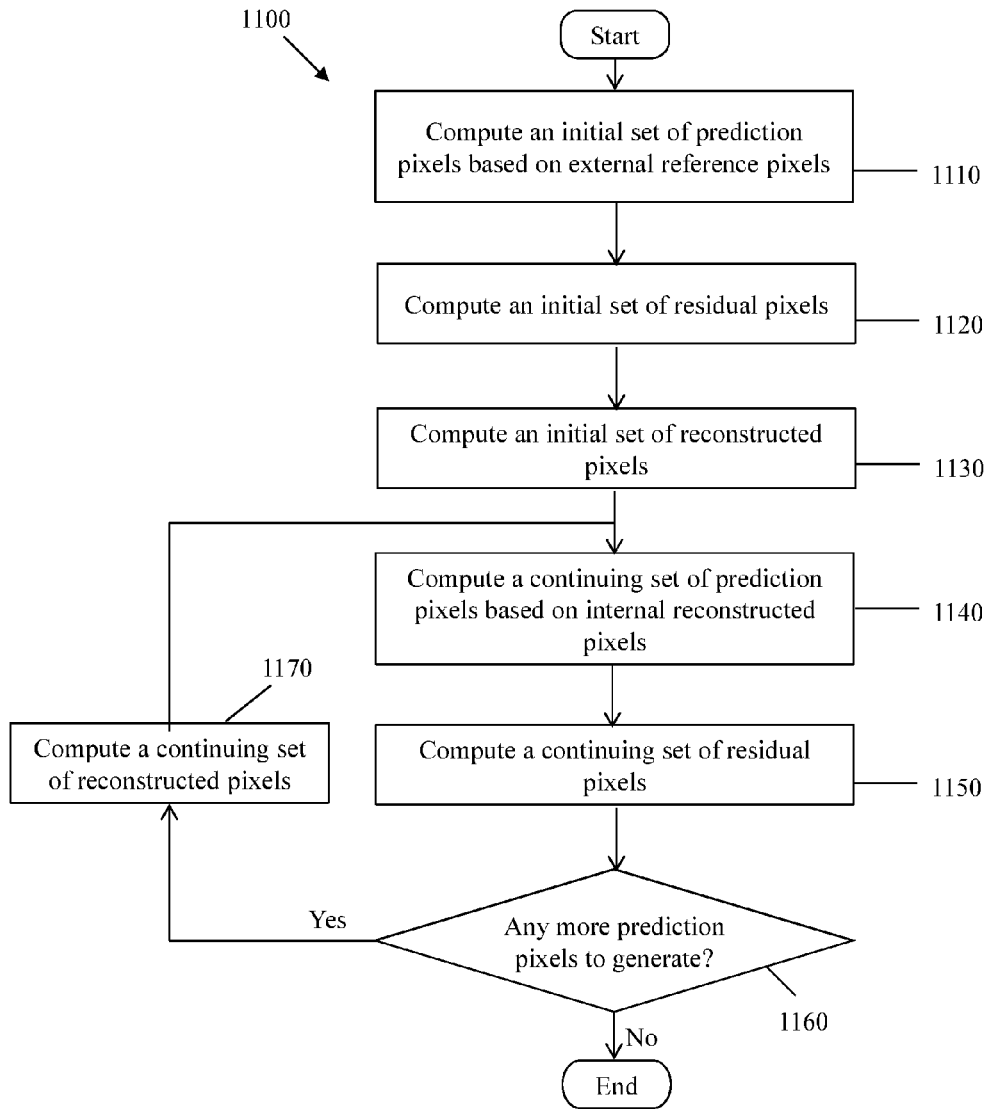
FIG. 13 is a flowchart of an embodiment of a pixel-based intra prediction method.

FIG. 13 illustrates an embodiment of a DPCM intra prediction method 1100, which may be implemented in a codec as part of a lossless coding scheme, such as the transform bypass encoding scheme 500 or the transform bypass decoding scheme 600. The method 1100 may be implemented in any of a plurality of directional and non-directional intra prediction modes. The method 1100 starts in step 1110, where an initial or first set of prediction pixels may be generated for a current block based on a plurality of external reference pixels located in blocks neighboring the current block. Next, in step 1120, the initial set of prediction pixels may be subtracted from corresponding original pixels of the current block, generating an initial set of residual pixels. Depending on an intra prediction mode, the initial set may be located in a row, a column, or both.

Next, in step 1130, the initial set of residual pixels and prediction pixels may be used to generate an initial set of reconstructed pixels for the current block. In step 1140, a continuing set of prediction pixels is computed based on internal reconstructed pixels using the algorithms described herein. For example, the initial set of reconstructed pixels may be used to generate a second set of prediction pixels. If intra prediction is in a directional mode with a preconfigured direction, a pixel in each continuing set of prediction pixels is one position behind a corresponding pixel in a preceding set of prediction pixels according to the direction. For example, a pixel in the second set of prediction pixels is one position behind a corresponding pixel in the initial set of prediction pixels.

In step 1150, a continuing set of residual pixels may be generated similar to the first set of residual pixels. Next, in block 1160, the method 1100 may determine if more prediction pixels need to be computed for the current block. If the condition in the block 1160 is met, the method 1100 may proceed to step 1170. Otherwise, the method 1100 may end. In step 1170, a continuing set of reconstructed pixels may be generated, which may be used again to generate continuing sets of prediction pixels until all prediction pixels for the current blocks have been computed. It should be understood that the method 1100 may only include a portion of all necessary coding steps, thus other steps, such as scanning, encoding, transmitting, and filtering of residual pixels, may also be incorporated into the encoding process wherever appropriate.

Figure 14:
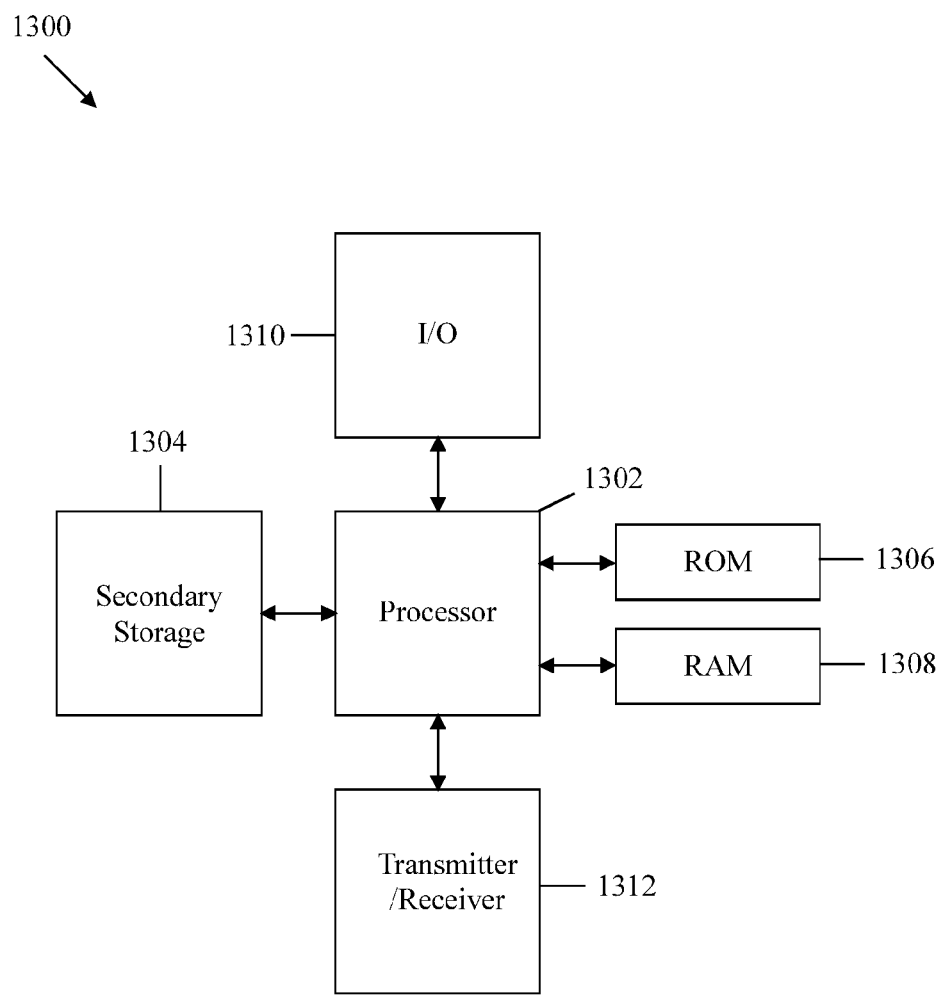
FIG. 14 is a schematic diagram of a computer system.

The schemes described above may be implemented on a general-purpose network component, such as a computer or network component with sufficient processing power, memory resources, and network throughput capability to handle the necessary workload placed upon it. FIG. 14 illustrates an embodiment of a network component or computer system 1300 suitable for implementing one or more embodiments of the methods disclosed herein, such as the DPCM intra prediction scheme 400, the transform bypass encoding scheme 500, the transform without quantization encoding scheme 700, the quantization without transform encoding scheme 900, and the DPCM intra prediction method 1100. The network component or computer system 100 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the transform bypass encoding scheme 500, the transform without quantization encoding scheme 700, the quantization without transform encoding scheme 900, and the DPCM intra prediction method 1100. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the computer system 1300. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the computer system 1300, at least one of the processor 1302, the RAM 1308, and the ROM 1306 are changed, transforming the computer system 1300 in part into a particular machine or apparatus (e.g., a video codec having the novel functionality taught by the present disclosure). It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
a memory; and
a processor operably coupled to the memory and configured to:
compute a reconstructed pixel based on a residual pixel and a first prediction pixel; and
compute a second prediction pixel in a directional intra prediction mode based on the reconstructed pixel, wherein the first prediction pixel and the second prediction pixel are located in a same block of a video frame.

2. The video codec of claim 1, wherein the first prediction pixel is one position before the second prediction pixel according to a direction of the directional intra prediction mode.

3. The video codec of claim 2, wherein the processor is further configured to compute the first prediction pixel based on one or more external reference pixels located outside the block prior to computing the reconstructed pixel.

4. The video codec of claim 3, wherein the processor is further configured to select the directional intra prediction mode from a plurality of directional intra prediction modes, wherein a number of the directional intra prediction modes is no greater than 33.

5. The video codec of claim 1, wherein α denotes an angle between the directional intra prediction mode and a vertical upright direction, wherein α has a unit of degrees, and wherein when 0<α<45 or −45<α<0, each prediction pixel is computed as a weighted linear combination of two reference pixels adjacent to each other.

6. The video codec of claim 5, wherein for each prediction pixel, two weights of the two reference pixels depend on α, and wherein the two weights add up to equal one.

7. The video codec of claim 6, wherein the processor is further configured to compute a plurality of prediction pixels including the first and second prediction pixels, wherein the block has a size of N×N, wherein N is an integer, wherein P(i, j) denotes a prediction pixel in a i-th row and j-th column, wherein R(i, j) denotes a reconstructed pixel in a i-th row and j-th column, wherein X(j) denotes an external reference pixel in an upper row and j-th column, and wherein computing a prediction pixel comprises equations:
if α=45,
for i=0, . . . , N−1, $P(i,N-1)=X(i+N);$ for j=0, . . . , N−2, $P(0,j)=X(j+1);$ and for i=1, . . . , N−1 and j=0, . . . , N−2, $P(i,j)=R(i-1,j+1).$ 8. The video codec of claim 7, wherein when 0<α<45, for i=0, . . . , N−1, $u=\lfloor (i+1)\cdot\tan(\alpha)\rfloor,$ $s=(i+1)\cdot\tan(\alpha)-u,$ and $P(i,N-1)=(1-s)\cdot X(N-1+u)+s\cdot X(N-1+u+1),$ where u and s are intermediate variables;
for j=0, . . . , N−2, $P(0,j)=(1-\tan(\alpha))\cdot X(j)+\tan(\alpha)\cdot X(j+1);$ for i=1, . . . , N−1 and j=0, . . . , N−2, $P(i,j)=(1-\tan(\alpha))\cdot R(i-1,j)+\tan(\alpha)\cdot R(i-1,j+1).$ 9. The video codec of claim 8, wherein when α=0, for j=0, . . . , N−1, $P(0,j)=X(j);$ for i=1, . . . , N−1 and j=0, . . . , N−1, $P(i,j)=R(i-1,j).$ 10. The video codec of claim 9, wherein Y(i) denotes an external reference pixel in a left neighboring column and i-th row, and wherein when −45<α<0,
for i=0, . . . , N−1, $u=\lfloor (i+1)\cdot\tan(-\alpha)\rfloor,$ $s=(i+1)\cdot\tan(-\alpha)-u,$ $P(i,0)=(1-s)\cdot Y(\lfloor(-u+1)\cdot\tan^{-1}(\alpha)\rfloor-1)+s\cdot Y(\lfloor(-u)\cdot\tan^{-1}(\alpha)\rfloor-1);$ for j=1, . . . , N−1, $P(0,j)=(1-\tan(-\alpha))\cdot X(j)+\tan(-\alpha)\cdot X(j-1);$ for i=1, . . . , N−1 and j=1, . . . , N−1, $P(i,j)=(1-\tan(-\alpha))\cdot R(i-1,j)+\tan(-\alpha)\cdot R(i-1,j-1).$ 11. The video codec of claim 10, wherein when α=−45:
for i=0, . . . , N−1, $P(i,0)=Y(i-1);$ for j=1, . . . , N−1, $P(0,j)=X(j-1);$ for i=1, . . . , N−1 and j=1, . . . , N−1, $P(i,j)=R(i-1,j-1).$ 12. The video codec of claim 11, wherein when −135≤α≤−45, computing the prediction pixels comprises transposing the block and its external reference pixels such that α is rotated to be in a range of −45≤α≤45.

13. The video codec of claim 11, wherein each reconstructed pixel has a value equal to its corresponding original pixel.

14. The video codec of claim 6, wherein the processor is further configured to:
compute a difference between each prediction pixel and its corresponding original pixel to generate a plurality of residual pixels; and
entropy encode the plurality of residual pixels to generate encoded data,
wherein the video codec further comprises a transmitter coupled to the processor and configured to transmit the encoded data.

15. The video codec of claim 6, further comprising a receiver coupled to the processor and configured to receive a bit-stream comprising a plurality of encoded residual pixels, and wherein the processor is further configured to decode the plurality of encoded residual pixels to generate a plurality of decoded residual pixels including the residual pixel.

16. A method for video coding performed by a system having at least one processor, the method comprising:
computing, by the at least one processor, a reconstructed pixel based on a residual pixel and a first prediction pixel; and
computing, by the at least one processor, a second prediction pixel in a directional intra prediction mode based on the reconstructed pixel, wherein the first prediction pixel and the second prediction pixel are located in a same block of a video frame.

17. The method of claim 16, wherein the first prediction pixel is one position before the second prediction pixel according to a direction of the directional intra prediction mode.

18. The method of claim 17, wherein prior to computing the reconstructed pixel, the method further comprises:
selecting the directional intra prediction mode from a plurality of directional intra prediction modes, wherein a number of the directional intra prediction modes is no greater than 33; and
computing the first prediction pixel based on one or more external reference pixels located outside the block.

19. The method of claim 16, wherein α denotes an angle between the directional intra prediction mode and a vertical upright direction, wherein α has a unit of degrees, and wherein when 0<α<45 or −45<α<0, each prediction pixel is computed as a weighted linear combination of two reference pixels adjacent to each other.

20. The method of claim 19, wherein for each prediction pixel, two weights of the two reference pixels depend on α, and wherein the two weights add up to equal one.

21. A video codec comprising a processor configured to:
use intra prediction to generate a prediction pixel adaptively based on a plurality of reconstructed neighboring pixels, wherein a distance between the prediction pixel and each of the plurality of reconstructed neighboring pixels is one.

22. The video codec of claim 21, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, wherein the prediction pixel, denoted as P(X), is computed via equation;

$P(X)=(A+B+C+D)/4.$

23. The video codec of claim 21, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, wherein the prediction pixel, denoted as P(X), is computed via equation:

$P(X)=\text{median}(A,B,C,D).$

24. The video codec of claim 21, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, wherein the prediction pixel, denoted as P(X), is computed via equation:

$$P(X) = \begin{cases} \min(A, B) & \text{if } C \geq \max(A, B) \\ \max(A, B) & \text{if } C \leq \min(A, B) \\ A + B - C & \text{else} \end{cases}.$$

25. A method for intra prediction performed by a system having at least one processor, the method comprising:
computing, by the at least one processor, a prediction pixel adaptively based on a plurality of reconstructed neighboring pixels, wherein a distance between the prediction pixel and each of the plurality of reconstructed neighboring pixels is one.

26. The method of claim 25, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, wherein the prediction pixel, denoted as P(X), is computed via equation:

$P(X)=(A+B+C+D)/4.$

27. The method of claim 25, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, and wherein the prediction pixel, denoted as P(X), is computed via equation:

$P(X)=\text{median}(A,B,C,D).$

28. The method of claim 25, wherein the plurality of reconstructed neighboring pixels comprises a left neighboring pixel, an upper neighboring pixel, an upper-left neighboring pixel, and an upper-right pixel with reconstructed values denoted as A, B, C, and D respectively, and wherein the prediction pixel, denoted as P(X), is computed via equation:

$$P(X) = \begin{cases} \min(A, B) & \text{if } C \geq \max(A, B) \\ \max(A, B) & \text{if } C \leq \min(A, B) \\ A + B - C & \text{else} \end{cases}.$$

* * * * *